US008466387B2

United States Patent
Fukuda et al.

(10) Patent No.: US 8,466,387 B2
(45) Date of Patent: Jun. 18, 2013

(54) LASER PROCESSING METHOD

(75) Inventors: Shigeki Fukuda, Kyoto (JP);
Katsutoshi Hamada, Kyoto (JP);
Takayuki Okada, Kyoto (JP)

(73) Assignee: Nidec Corporation, Kyoto (JP)

( * ) Notice: Subject to any disclaimer, the term of this patent is extended or adjusted under 35 U.S.C. 154(b) by 1192 days.

(21) Appl. No.: 12/353,387

(22) Filed: Jan. 14, 2009

(65) Prior Publication Data
US 2009/0183190 A1 Jul. 16, 2009

(30) Foreign Application Priority Data

Jan. 15, 2008 (JP) ................................. 2008-005250

(51) Int. Cl.
*B23K 26/00* (2006.01)
*B23K 26/40* (2006.01)
*B23K 26/38* (2006.01)
*B23K 26/12* (2006.01)

(52) U.S. Cl.
CPC ............. *B23K 26/4075* (2013.01); *B23K 26/38* (2013.01); *B23K 26/123* (2013.01)
USPC ..................... 219/121.72; 720/695

(58) Field of Classification Search
CPC ................................................. B23K 26/4075
USPC ............ 219/121.63, 121.64, 121.84; 29/597, 29/596, 598; 123/506; 310/231, 233
See application file for complete search history.

(56) References Cited

U.S. PATENT DOCUMENTS

| 3,949,186 | A | * | 4/1976 | Nakayama et al. ...... 219/121.14 |
| 4,580,334 | A | * | 4/1986 | McCracken et al. ............ 29/597 |
| 4,992,643 | A | | 2/1991 | Fuerschbach et al. |
| 5,666,716 | A | | 9/1997 | Parsoneault et al. |
| 5,978,175 | A | | 11/1999 | Wuester, Sr. et al. |
| 6,375,357 | B2 | | 4/2002 | Miura et al. |
| 6,765,173 | B2 | * | 7/2004 | Suzuki ..................... 219/121.63 |
| 6,781,266 | B2 | | 8/2004 | Le et al. |
| 2003/0160029 | A1 | * | 8/2003 | Yasoda et al. .............. 219/121.7 |
| 2004/0226927 | A1 | * | 11/2004 | Morikazu et al. ......... 219/121.84 |
| 2005/0274018 | A1 | | 12/2005 | Gomyo et al. |
| 2006/0065651 | A1 | * | 3/2006 | Zhang et al. ............. 219/121.86 |

FOREIGN PATENT DOCUMENTS

| CN | 1704202 A | | 12/2005 |
| JP | 57-056190 | * | 4/1982 |
| JP | 57-56190 A | | 4/1982 |
| JP | 6-269975 A | | 9/1994 |
| JP | 8-192289 A | | 7/1996 |
| JP | 11-267874 | * | 10/1999 |
| JP | 11-267874 A | | 10/1999 |
| JP | 11-267876 A | | 10/1999 |
| JP | 2000-317671 A | | 11/2000 |
| JP | 2004-1043 A | | 1/2004 |

(Continued)

*Primary Examiner* — Henry Yuen
*Assistant Examiner* — Thien S Tran
(74) *Attorney, Agent, or Firm* — Keating & Bennett, LLP

(57) ABSTRACT

In a laser processing method, a workpiece is set with respect to a jig having a laser passage hole and a relative position of the jig and the workpiece is determined so that the laser passage hole can face toward a target processing point on the workpiece. Then, laser light is irradiated on the target processing point through the laser passage hole while creating a stream of an inert gas flowing from a peripheral area of the target processing point toward the target processing point and flowing away from the workpiece through the laser passage hole.

11 Claims, 20 Drawing Sheets

FOREIGN PATENT DOCUMENTS

| | | | |
|---|---|---|---|
| JP | 2004001043 A * | 1/2004 | |
| JP | 2004-337947 A | 12/2004 | |
| JP | 2005-344785 A | 12/2005 | |
| JP | 2005-344793 A | 12/2005 | |

* cited by examiner

LASER PROCESSING METHOD

BACKGROUND OF THE INVENTION

1. Field of the Invention

The present invention relates to a laser processing technique for processing a workpiece by irradiating laser light on the workpiece.

2. Description of the Related Art

In a process for manufacturing apparatus or device, e.g., a disk drive apparatus, a spindle motor or a bearing device, laser processing in which various precision parts used in the apparatus or device are processed by irradiating laser light thereon is performed. To be more specific, the laser processing includes laser welding in which two precision parts are welded together by laser light, laser forming in which the posture of a precision part is adjusted by laser light, laser trimming in which the surface of a precision part is cut by laser light, and laser marking in which letters or symbols are carved on the surface of a precision part by laser light.

Conventionally, laser processing has been performed in such a way that laser light is irradiated while a nitrogen gas is injected toward a workpiece. This is to prevent a workpiece (e.g., precision part to be processed) from being oxidized by the irradiation of laser light.

As the laser light is irradiated on a target processing point of the workpiece, however, the temperature of the target processing point is increased and fumes (or metal vapors) are generated from the target processing point. This poses a problem in that the fumes adhere to the surface of the workpiece near the target processing point. Particularly, if the laser light is irradiated while injecting a nitrogen gas toward the workpiece as in the conventional case, the fumes generated from the target processing point are injected toward the surface of the workpiece together with the nitrogen gas. This worsens the problem of fume adherence.

FIG. 20 is a micrograph showing the surface of a workpiece near a target processing point after a sleeve and a cap employed in a bearing device have been laser-welded according to a conventional method. It can be seen in FIG. 20 that multiple white spots generated by the adherence of fumes exist on the surface of the workpiece that has undergone the conventional laser welding.

With the conventional method, fumes adhere to the surface of the workpiece during the laser processing as mentioned above. Therefore, a process (a cleaning operation) for wiping away the fumes from the surface of the workpiece needs to be carried out after the laser processing. Another problem is that the laser processing is not applicable to the hard-to-clean internal regions of precision parts.

SUMMARY OF THE INVENTION

In order to overcome the problems described above, preferred embodiments of the present invention provide a laser processing technique capable of reducing diffusion of fumes near the surface of a workpiece and preventing the surface of the workpiece from being contaminated by the fumes.

In accordance with a preferred embodiment of the present invention, there is provided a laser processing method including: a) a step of setting a workpiece with respect to a jig having a laser passage hole and determining a relative position of the jig and the workpiece so that the laser passage hole can face toward a target processing point on the workpiece; and b) a step of, subsequently to the step a), irradiating laser light on the target processing point through the laser passage hole while creating a stream of an inert gas flowing from a peripheral area of the target processing point toward the target processing point and flowing away from the workpiece through the laser passage hole.

With the laser processing method of a preferred embodiment of the present invention, the fumes generated from the target processing point can be discharged together with an inert gas away from the workpiece through a laser passage hole. This makes it possible to reduce diffusion of the fumes near the surface of the workpiece and to prevent the surface of the workpiece from being contaminated by the fumes.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings.

Description will be made first on a disk drive apparatus and a spindle motor, to which a laser processing method of the present invention is appropriately applicable. In the following description, the term "upper" refers to the side on which a rotor unit 4 lies along a central axis L and the term "lower" refers to the side on which a stator unit 3 lies along the central axis L. However, this is not intended to limit the installation posture of a bearing device, a disk drive apparatus and a spindle motor associated with the present invention.

1. Construction of Disk Drive Apparatus

Figure 1:
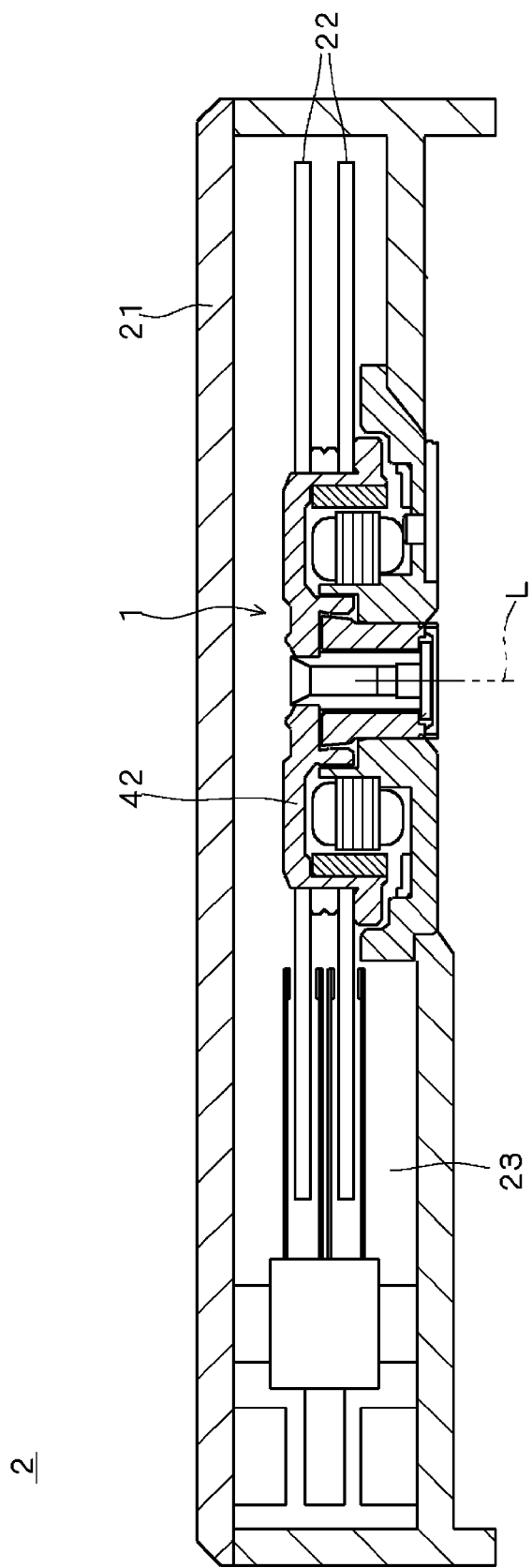
FIG. 1 is a vertical section view showing a disk drive apparatus.

FIG. 1 is a vertical section view showing a disk drive apparatus 2 related to a preferred embodiment of the present invention. The disk drive apparatus 2 is preferably a hard disk drive which reads information from and writes information on two magnetic disks 22 while rotating the latter. As shown in FIG. 1, the disk drive apparatus 2 preferably includes an apparatus housing 21, two magnetic disks (hereinafter simply referred to as "disks") 22, an access unit 23 and a spindle motor 1.

2. Construction of Spindle Motor

Figure 2:
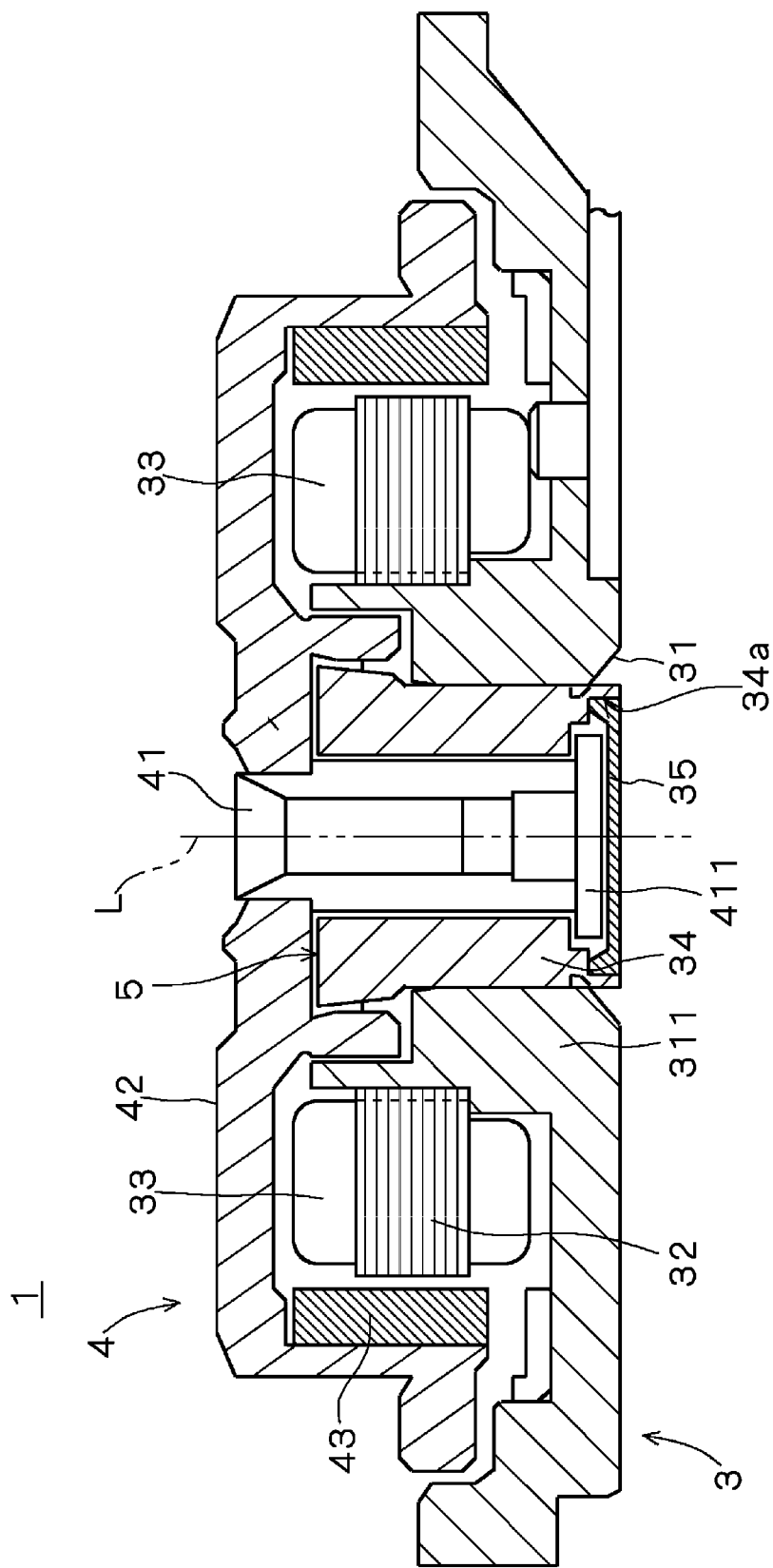
FIG. 2 is a vertical section view showing a spindle motor.

Next, description will be made on the detailed configuration of the spindle motor 1. FIG. 2 is a vertical section view showing the spindle motor 1. As shown in FIG. 2, the spindle motor 1 preferably includes a stator unit 3 fixed to the apparatus housing 21 of the disk drive apparatus 2, and a rotor unit 4 arranged to hold the disks 22 and rotate about a central axis L.

The stator unit 3 preferably includes a base member 31, a stator core 32, a coil 33 and a sleeve 34.

The sleeve 34 is substantially a cylindrical member arranged on the outer circumferential surface of a shaft 41 so as to surround the shaft 41. The sleeve 34 is preferably fixed to the inner circumferential surface of a holder portion 311 of the base member 31. In the inner circumferential portion of the lower end of the sleeve 34, there is preferably provided a recess portion 34a at which a cap 35 can be fitted. The cap 35 is preferably attached to the recess portion 34a, after which the inner circumferential surface of the lower end of the sleeve 34 and the outer circumferential surface of the cap 35 are fixed to each other by the laser welding (described below).

The sleeve 34 and the cap 35 preferably functions as a fixed bearing member (a supporting member) which supports the shaft 41 for rotation about the central axis L. The sleeve 34, the cap 35 and the shaft 41 preferably constitute a dynamic fluid pressure bearing device 5.

The rotor unit 4 preferably includes the shaft 41, a hub 42 and a rotor magnet 43.

3. Laser Welding (First Preferred Embodiment)

The sleeve 34 and the cap 35 are preferably fixed to each other by laser welding. Hereinafter, description will be made on the process of fixing the sleeve 34 and the cap 35 together by laser welding in the manufacturing process of the bearing device 5, the spindle motor 1 or the disk drive apparatus 2.

According to the present preferred embodiment and second and third preferred embodiments, the shaft 41 is preferably inserted into the bearing bore of the sleeve 34, and then the hub 42 is preferably fixed to the upper end portion of the shaft 41 prior to the laser welding. The cap 35 preferably is tentatively fixed to the lower surface of the sleeve 34. Note that, when performing the laser welding, the unit including the sleeve 34, the cap 35, the shaft 41 and the hub 42 is treated as a subject of laser welding, i.e., a workpiece 6.

Figure 3:
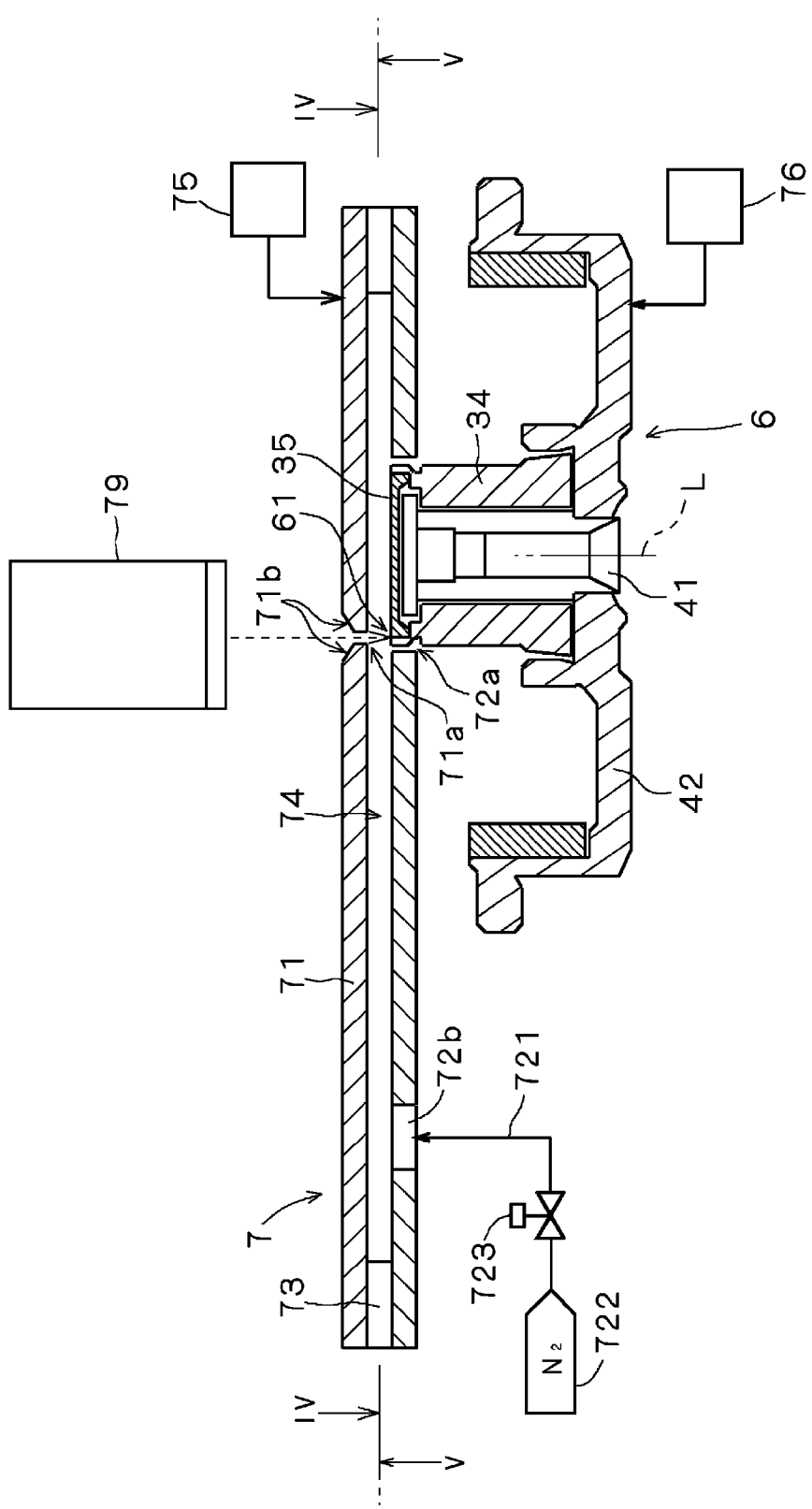
FIG. 3 is a view showing an arrangement for realizing a laser welding process in accordance with a first preferred embodiment of the present invention.

FIG. 3 shows an arrangement for realizing the laser welding process of the present preferred embodiment. As shown in FIG. 3, a jig 7 and a laser light source 79 are preferably used in the laser welding process of the present preferred embodiment. The jig 7 preferably is detachably attached to the workpiece 6. The jig 7 preferably includes an upper plate member (a first plate member) 71, a lower plate member (a second plate member) 72 and a spacer 73. The upper plate member 71 and the lower plate member 72 are preferably opposed to each other, with the spacer 73 interposed therebetween. A thin internal space 74 is preferably formed between the upper plate member 71 and the lower plate member 72.

Figure 4:
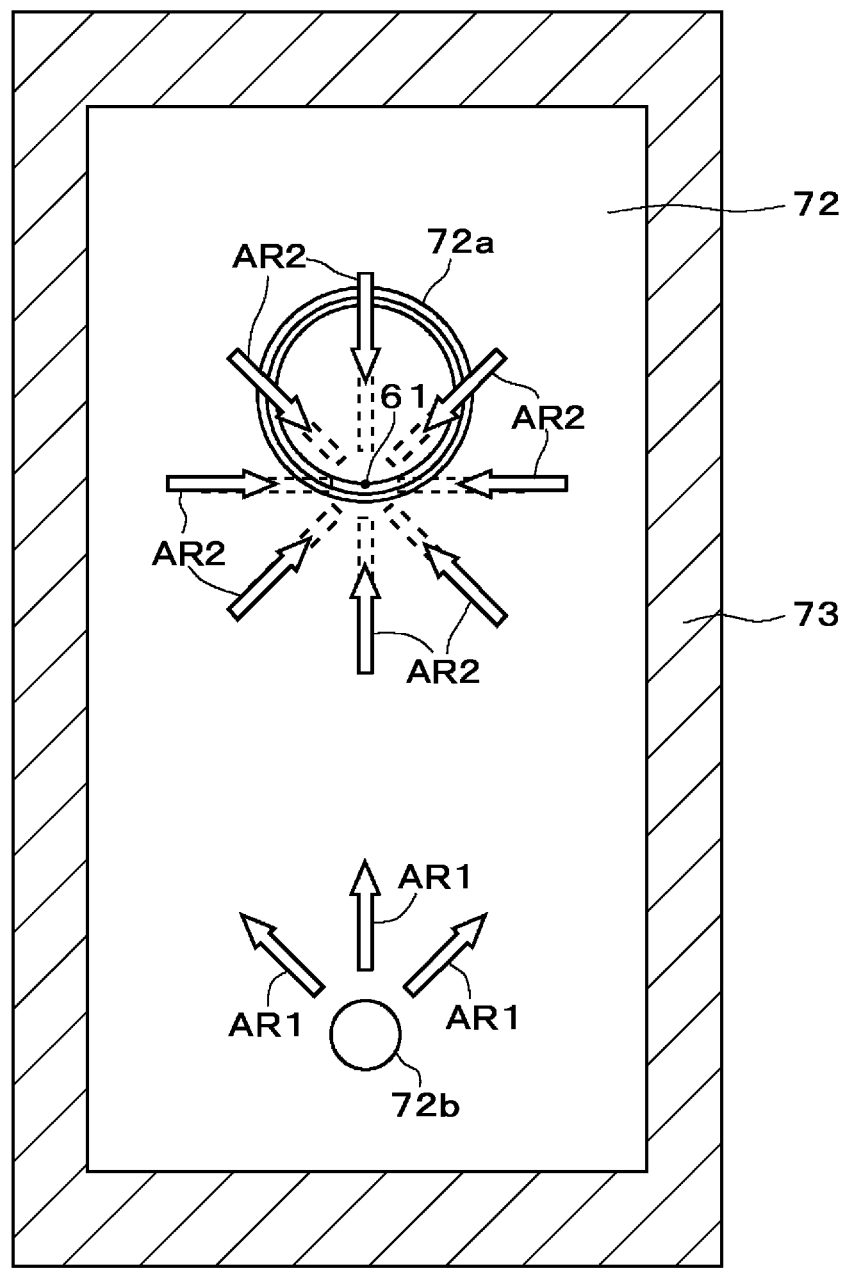
FIG. 4 is a horizontal section view taken along line IV-IV in FIG. 3, showing a lower plate member as seen from the medial plane of a spacer.

FIG. 4 is a view showing the lower plate member 72 as seen from the position indicated by line IV-IV in FIG. 3. As shown in FIGS. 3 and 4, the lower plate member 72 preferably includes a workpiece insertion hole 72a into which the end portion of the sleeve 34 including a target processing point 61 (a point lying on the contact surface between the sleeve 34 and the cap 35) is inserted, and an inlet port 72b which is preferably used to introduce nitrogen gas into the internal space 74 of the jig 7. A nitrogen gas supplying pipe 721 is preferably connected to the inlet port 72b. Also, a nitrogen gas source 722 is preferably coupled to the upstream end portion of the nitrogen gas supplying pipe 721. A shutoff valve 723 is preferably provided on the nitrogen gas supplying pipe 721. Therefore, if the shutoff valve 723 is opened, nitrogen gas is preferably supplied from the nitrogen gas source 722 into the internal space 74 of the jig 7 through the nitrogen gas supplying pipe 721 and the inlet port 72b.

Figure 5:
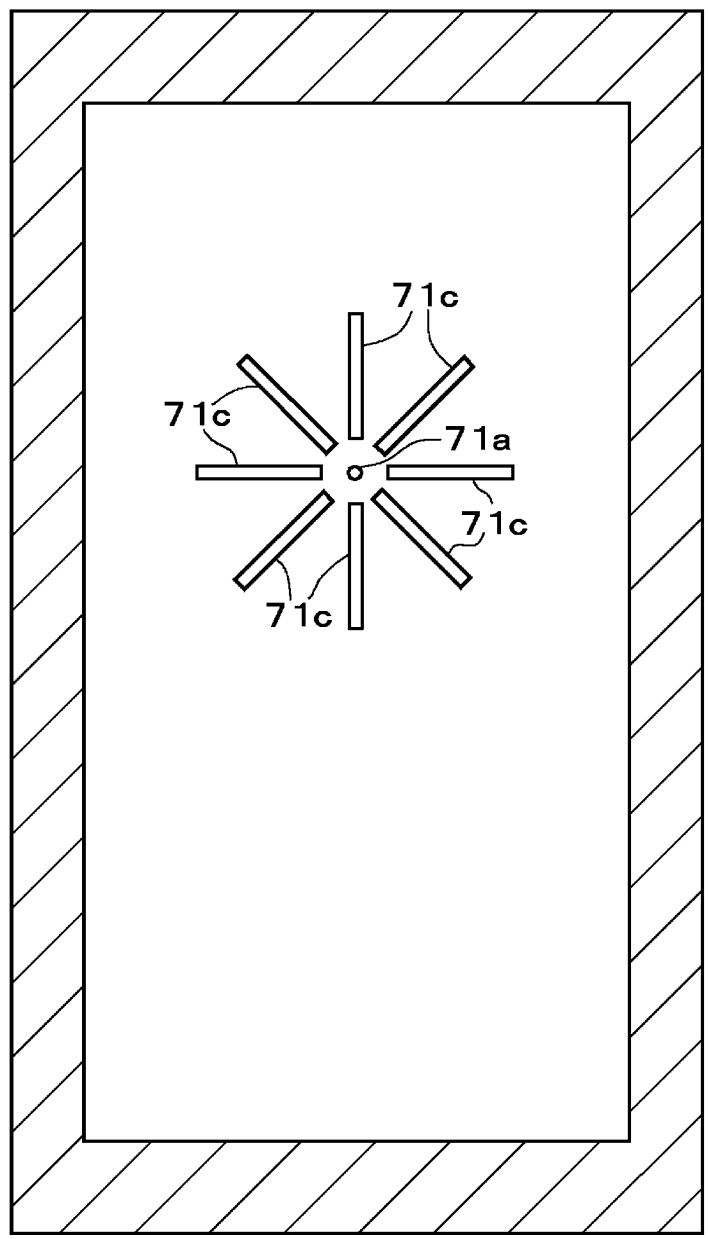
FIG. 5 is a horizontal section view taken along line V-V in FIG. 3, showing an upper plate member as seen from the medial plane of a spacer.

FIG. 5 is a view showing the upper plate member 71 as seen from the position indicated by line V-V in FIG. 3. As shown in FIGS. 3 and 5, the upper plate member 71 preferably includes a laser passage hole 71a via which the laser light irradiated from the laser light source 79 travels. The laser passage hole 71a is preferably arranged in such a position as to face toward the target processing point 61 of the workpiece 6 when the end portion of the sleeve 34 is inserted into the workpiece insertion hole 72a of the lower plate member 72. In the laser welding process of the present preferred embodiment, the annular contact surface between the sleeve 34 and the cap 35 is preferably welded over its approximately entire circumference while rotating the workpiece 6 about the central axis L. The target processing point 61 is set at one point through which the contact surface passes during rotation of the workpiece 6. The laser passage hole 71a is arranged above the target processing point 61.

As can be seen in FIG. 3, the laser passage hole 71a preferably includes a tapered edge portion 71b converging toward the lower plate member 72 (the workpiece 6). Referring to FIG. 5, a plurality of guide grooves 71c radially extending around the laser passage hole 71a are preferably arranged on the surface of the upper plate member 71 which faces toward the lower plate member 72.

As conceptually shown in FIG. 3, an elevating mechanism 75 arranged to move the jig 7 vertically is preferably connected to the jig 7. The elevating mechanism 75 may preferably be realized through the use of, e.g., a combined mechanism of a motor and a ball screw. Many other driving devices well-known in the art may be used in order to realize the elevating mechanism 75. Also, as conceptually depicted in FIG. 3, the workpiece 6 is preferably supported by a rotary mechanism 76 which rotates the workpiece 6 about the central axis L. The rotary mechanism 76 may preferably be realized by, e.g., combining a chuck for holding the workpiece 6 and a motor for rotating the chuck.

Figure 6:
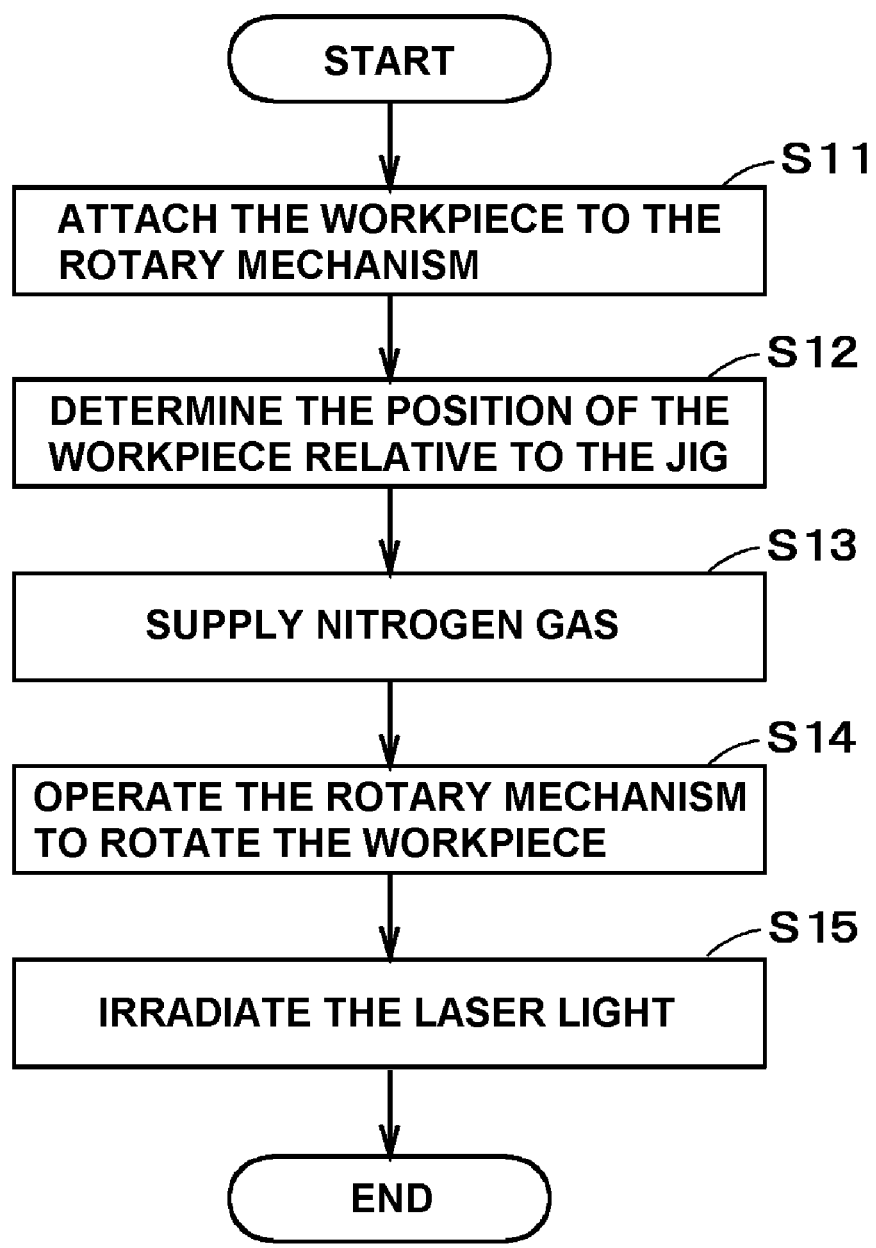
FIG. 6 is a flowchart illustrating the sequence of the laser welding process of the first preferred embodiment.

Next, the sequence of the laser welding process of the present preferred embodiment will be described with reference to the flowchart illustrated in FIG. 6.

When performing the laser welding process of the present preferred embodiment, the workpiece 6 is first attached to the rotary mechanism 76 in such a posture that the target processing point 61 preferably faces upwards (step S11). Then the elevating mechanism 75 is preferably operated to lower the jig 7 which is standing-by above the workpiece 6, thereby inserting the end portion of the sleeve 34 into the workpiece insertion hole 72a of the lower plate member 72. Consequently, the position of the workpiece 6 relative to the jig 7 is preferably adjusted so as to ensure that the laser passage hole 71a of the upper plate member 71 faces toward the target processing point 61 on the workpiece 6 (step S12).

Next, the shutoff valve 723 arranged on the nitrogen gas supplying pipe 721 is preferably opened. In response, nitrogen gas is preferably supplied from the nitrogen gas source 722 into the internal space 74 of the jig 7 through the nitrogen gas supplying pipe 721 and the inlet port 72b (step S13). The nitrogen gas introduced through the inlet port 72b of the lower plate member 72 is radially diffused from the inlet port 72b and filled in the internal space 74 as indicated by white arrows AR1 in FIG. 4. Around the laser passage hole 71a, the nitrogen gas preferably forms a stream flowing toward the laser passage hole 71a along the guide grooves 71c of the upper plate member 71 as indicated by white arrows AR2 in FIG. 4. The nitrogen gas is preferably discharged to the outside of the jig 7 through the laser passage hole 71a.

Then, the rotary mechanism 76 is preferably operated to rotate the workpiece 6 about the central axis L (step S14). The laser light source 79 is preferably allowed to continuously irradiate laser light while maintaining the supply of the nitrogen gas and rotate the workpiece 6 (step S15). As a consequence, welding occurs at the target processing point 61 on the workpiece. The contact surface between the sleeve 34 and the cap 35 which moves past the target processing point 61 along with rotation of the workpiece 6 is preferably welded over approximately the entire circumference thereof.

Figure 7:
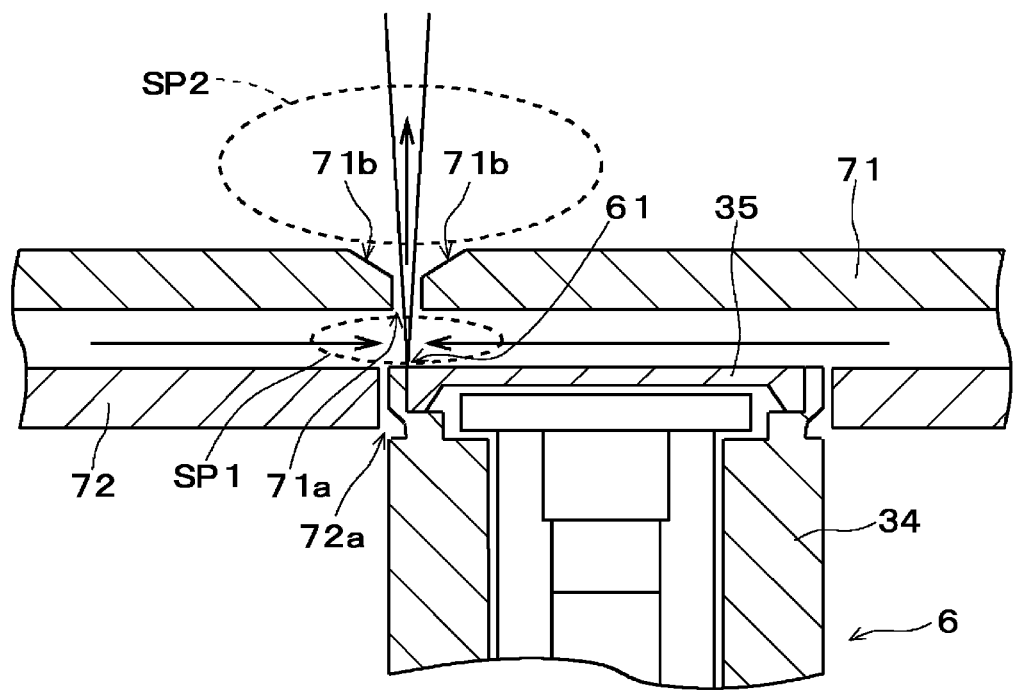
FIG. 7 is a view showing a state established around a target processing point during the laser welding process of the first preferred embodiment.

Upon irradiating the laser light on the target processing point 61 of the workpiece 6, fumes are generally generated from the target processing point 61. In step S15 of the present preferred embodiment, the stream of nitrogen gas flowing toward the target processing point 61 is formed around the target processing point 61 of the workpiece 6 as shown in FIG. 7. The pressure in the space SP1 (a first space) defined between the target processing point 61 and the laser passage hole 71a is greater than the pressure in the space SP2 (a second space) defined on the opposite side of the laser passage hole 71a from the workpiece 6. This preferably creates a nitrogen gas stream flowing from the space SP1 toward the space SP2 through the laser passage hole 71a. By virtue of such configuration, the fumes generated at the target processing point 61 is prevented from diffusing near the surface of the workpiece 6 and is discharged together with the inert gas to the space SP2 through the laser passage hole 71a. Thus, it becomes possible to prevent the surface of the workpiece 6 (i.e., the surfaces of the sleeve 34 and the cap 35) from being contaminated by the fumes.

In the present preferred embodiment, the nitrogen gas supplied to the internal space 74 of the jig 7 preferably serves to prevent oxidation of the target processing point 61 of the workpiece 6 and also serves as a carrier gas which leads the fumes generated at the target processing point 61 away from the workpiece 6.

The laser passage hole 71a of the present preferred embodiment preferably includes the tapered edge portion 71b converging toward the lower plate member 72 (the workpiece 6). By virtue of such configuration, a flow resistance at the laser passage hole 71a is preferably minimized even when the tapered edge portion 71b is not arranged. This ensures that the nitrogen gas and the fumes are smoothly discharged through the laser passage hole 71a.

The jig 7 of the present preferred embodiment is preferably designed so as to be detachable with respect to the workpiece 6. This makes it possible to easily and rapidly set the workpiece 6 with respect to the jig 7 and to improve the production efficiency during the laser welding process. Furthermore, since the nitrogen gas is supplied only into the thin internal space 74 of the jig 7, the nitrogen gas stream is rapidly and stably formed.

Preferably, the dimension of the workpiece insertion hole 72a is set such that, when the end portion of the sleeve 34 is inserted into the workpiece insertion hole 72a of the lower plate member 72, the gap (of annular shape) defined between the edge portion of the workpiece insertion hole 72a and the workpiece 6 becomes as small as possible. For example, the dimensions of the workpiece insertion hole 72a and the laser passage hole 71a are preferably set to ensure that the size (the aperture area in a plan view) of the gap formed between the edge portion of the workpiece insertion hole 72a and the workpiece 6 becomes smaller than the size (the aperture area in a plan view) of the laser passage hole 71a of the upper plate member 71. This makes it possible to prevent the nitrogen gas and the fumes from flowing out of the internal space 74 of the jig 7 toward the workpiece 6, thereby urging them to flow toward the laser passage hole 71a.

Figure 8:
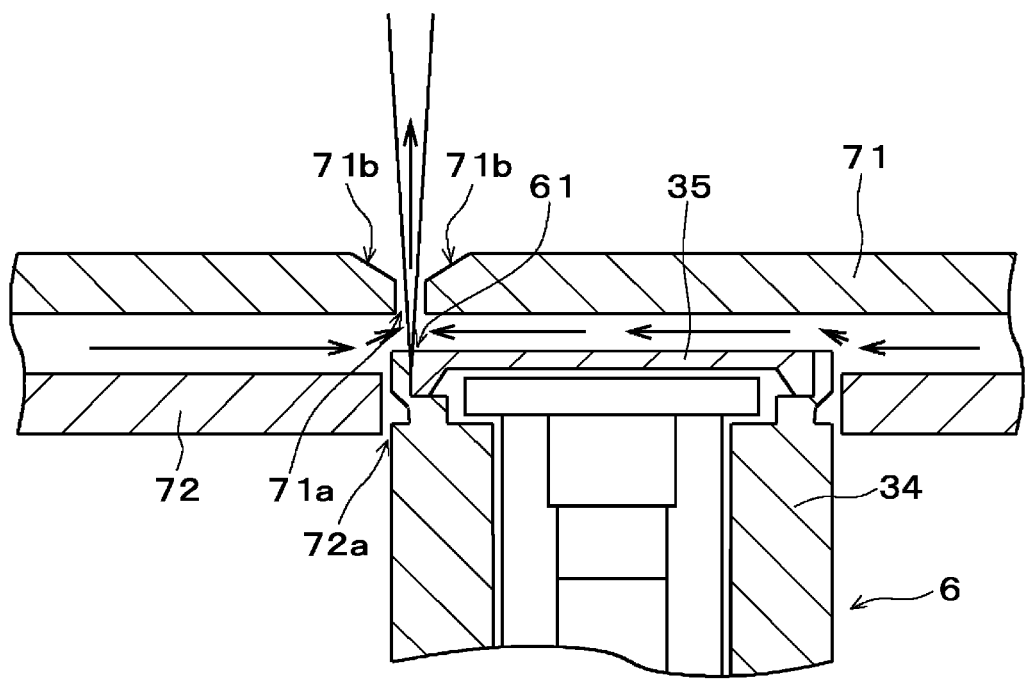
FIG. 8 is a view showing a state in which the target processing point is moved into an internal space out of a workpiece fitting hole.

In FIGS. 3 and 7, the vertical positions of the workpiece 6 and the jig 7 are set such that the surface of the workpiece 6 containing the target processing point 61 is approximately flush with the upper surface of the lower plate member 72. Alternatively, the surface of the workpiece 6 containing the target processing point 61 may be allowed to protrude from the workpiece insertion hole 72a into the internal space 74 as shown in FIG. 8. By such configuration, the target processing point 61 is preferably separated from the edge portion of the workpiece insertion hole 72a, while the target processing point 61 and the laser passage hole 71a come closer to each other. This makes it possible to more reliably prevent the fumes generated at the target processing point 61 from flowing toward the workpiece 6 through between the edge portion of the workpiece insertion hole 72a and the workpiece 6.

As set forth above, the upper plate member 71 of the present preferred embodiment preferably includes the guide grooves 71c each radially extending at the laser passage hole 71a. Even if the guide grooves 71c are absent, the nitrogen gas supplied into the internal space 74 of the jig 7 will preferably be discharged through the laser passage hole 71a, thus creating a nitrogen gas stream flowing from the peripheral area of the target processing point 61 toward the target processing point 61. However, the guide grooves 71c allows the nitrogen gas stream to be smoothly guided to the laser passage hole 71a. Also, it is preferable that the same guide grooves as those of the upper plate member 71 are arranged in the lower plate member 72 over such an extent as not to overlap with the workpiece insertion hole 72a.

Figure 9:
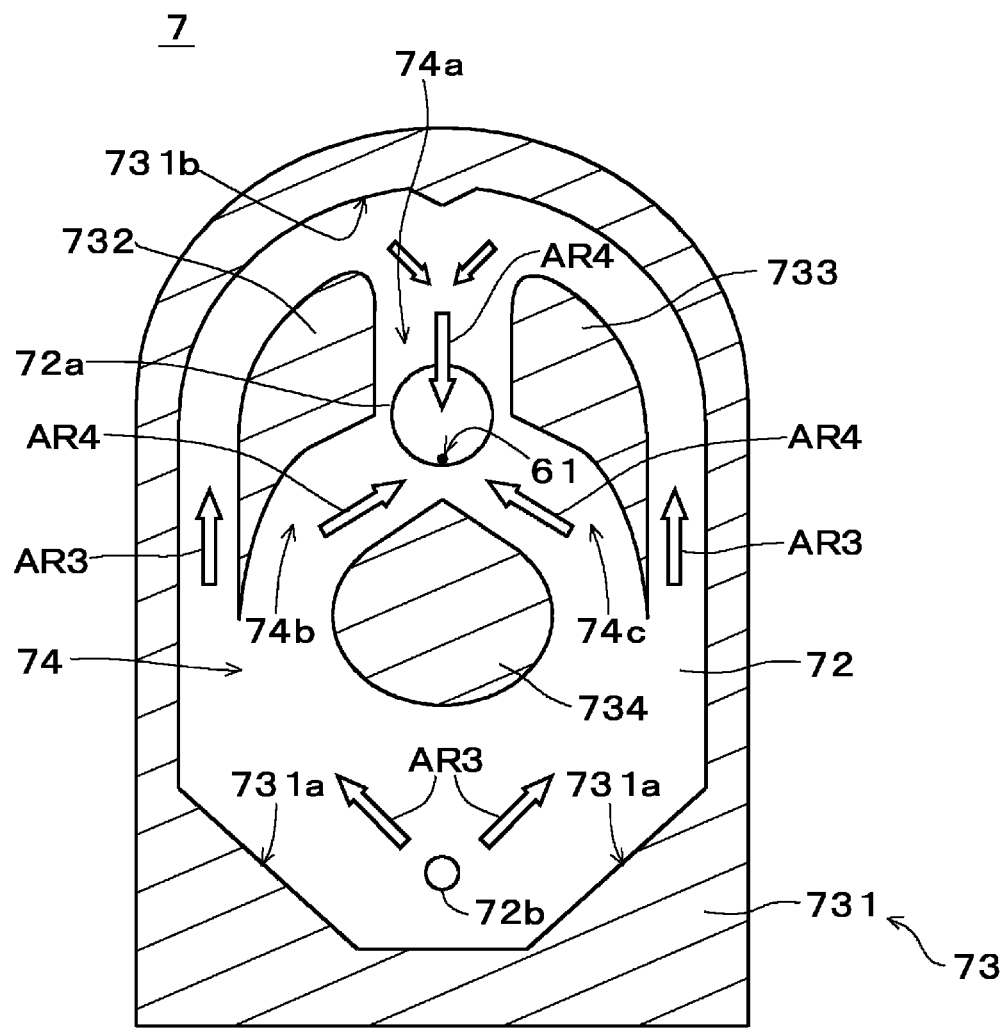
FIG. 9 is a view showing another example of the jig having a spacer of different shape.
Figure 10:
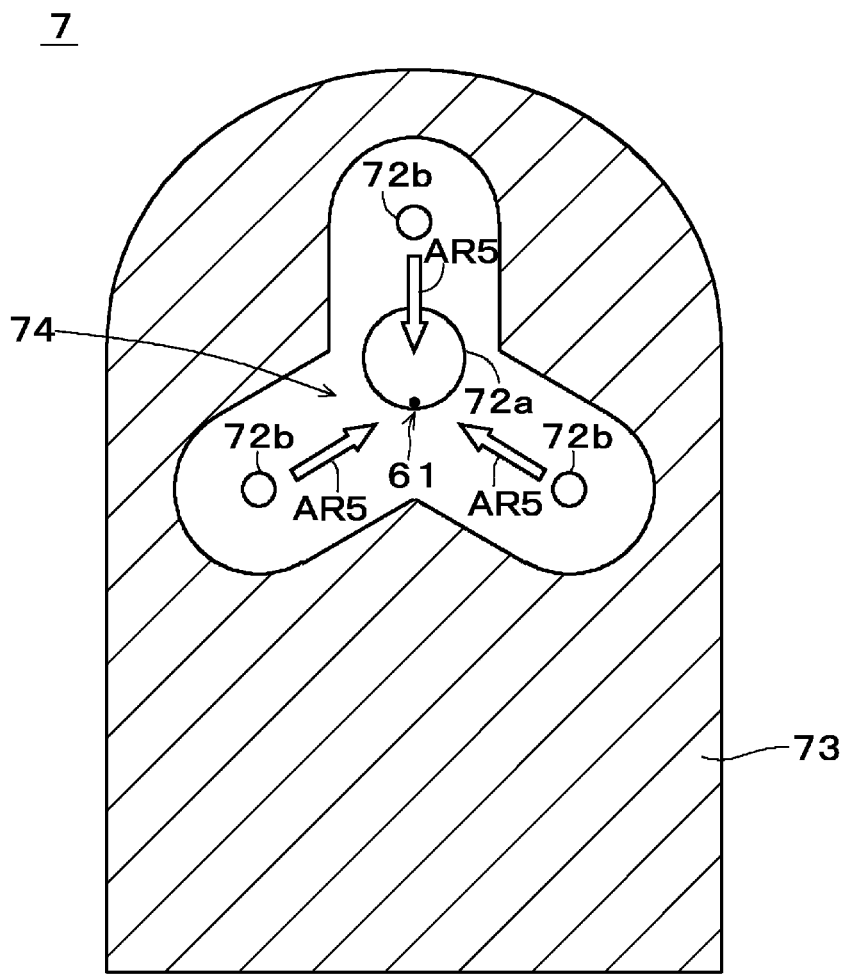
FIG. 10 is a view showing a further example of the jig having a spacer of different shape.
Figure 11:
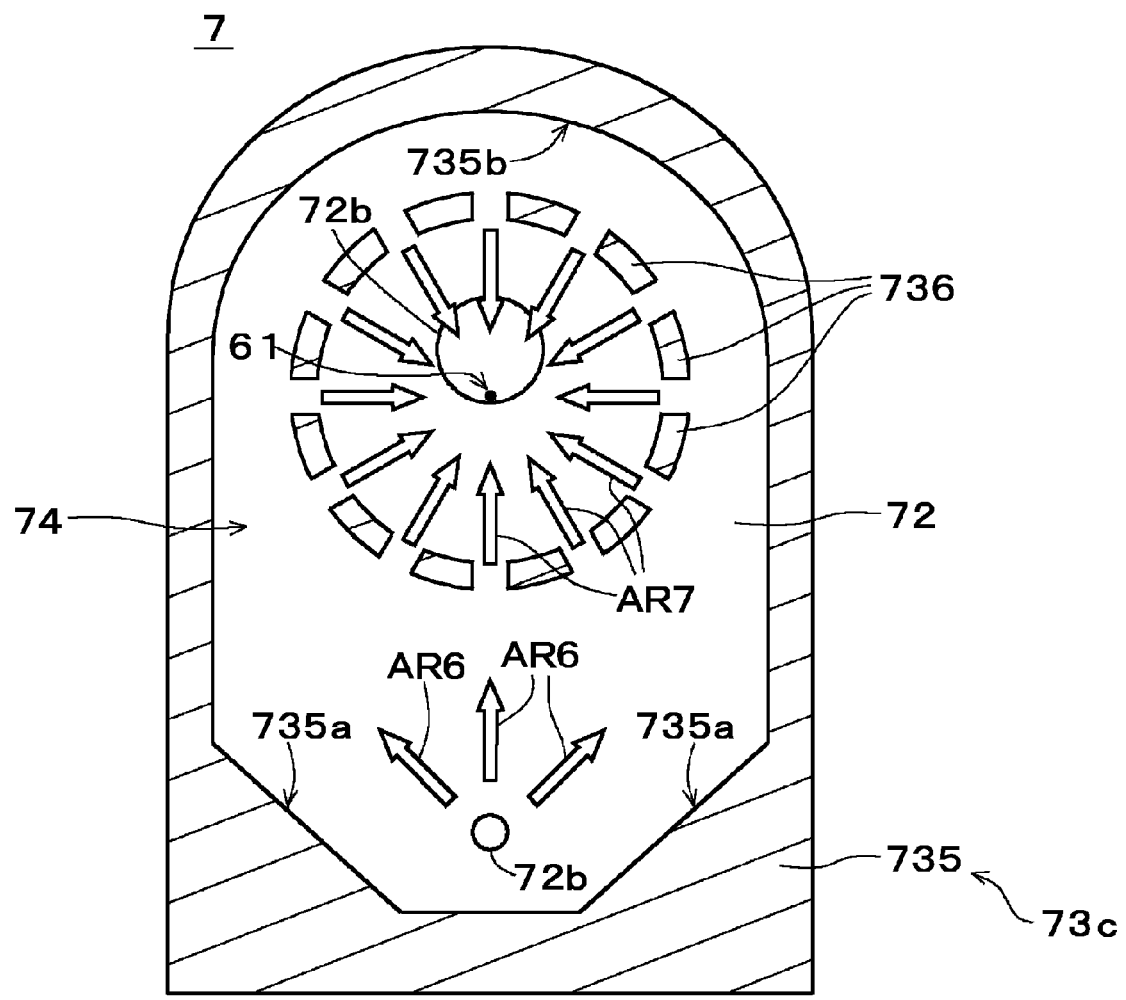
FIG. 11 is a view showing a still further example of the jig having a spacer of different shape.

The shape of the spacer 73 may be modified in order to improve the stream flowing from the peripheral area of the target processing point 61 toward the target processing point 61 at the internal space 74 of the jig 7. FIGS. 9 through 11 illustrate other examples of the jig 7 having spacers 73 of different shapes. FIGS. 9 through 11 are horizontal section views of the lower plate member 72 as seen from the medial plane of the spacer 73.

The jig 7 shown in FIG. 9 preferably includes a spacer 73 having a spacer piece 731 which substantially surrounds the outer circumference of the internal space 74 and three space pieces 732, 733 and 734 arranged around the target processing point 61. The spacer piece 731 preferably includes a guide surface 731a arranged to guide the nitrogen gas stream introduced from the inlet port 72b, and an arc-shaped guide surface 731b approximately concentric with the target processing point 61. Flow paths 74a to 74c through which the nitrogen gas flows toward the target processing point 61 are preferably arranged between the three space pieces 732, 733 and 734. By virtue of such configuration, the nitrogen gas introduced through the inlet port 72b into the internal space 74 is preferably diffused along the inner circumferential surface of the spacer piece 731 as indicated by arrows AR3. Then, a nitrogen gas stream flowing toward the target processing point 61 through the flow paths 74a to 74c is effectively formed as indicated by arrows AR4.

The jig 7 shown in FIG. 10 preferably includes a spacer 73 having an opening that includes substantially a trifurcated internal space 74 radially extending about the target processing point 61. The lower plate member 72 preferably includes three inlet ports 72b near the end portions of each trifurcated internal space 74 through which nitrogen gas is introduced. The same nitrogen gas supplying pipe 721 as shown in FIG. 4 is preferably connected to each of the three inlet ports 72b. If the nitrogen gas is introduced through the three inlet ports 72b into the trifurcated internal space 74, nitrogen gas stream flowing toward the target processing point 61 through the trifurcated internal space 74 is effectively formed as indicated by arrows AR5.

The jig 7 shown in FIG. 11 preferably includes a spacer 73 having a spacer piece 735 which substantially surrounds the outer circumference of the internal space 74 and a plurality of space pieces 736 arranged around the target processing point 61. The spacer piece 735 preferably includes a guide surface 735a which guides the nitrogen gas stream introduced through the inlet port 72b, and an arc-shaped guide surface 735b substantially concentric with the target processing point 61. The spacer pieces 736 are preferably arranged in an a annular manner around the target processing point 61 at even intervals. By virtue of such configuration, the nitrogen gas introduced through the inlet port 72b into the internal space 74 of the jig 7 is preferably diffused along the inner circumferential surface of the spacer piece 735 as indicated by arrows AR6. Then, a nitrogen gas stream flowing toward the target processing point 61 through between the spacer pieces 736 is effectively formed as indicated by arrows AR7.

4. Laser Welding (Second Preferred Embodiment)

Next, description will be made on a laser welding process in accordance with a second preferred embodiment of the present invention.

Figure 12:
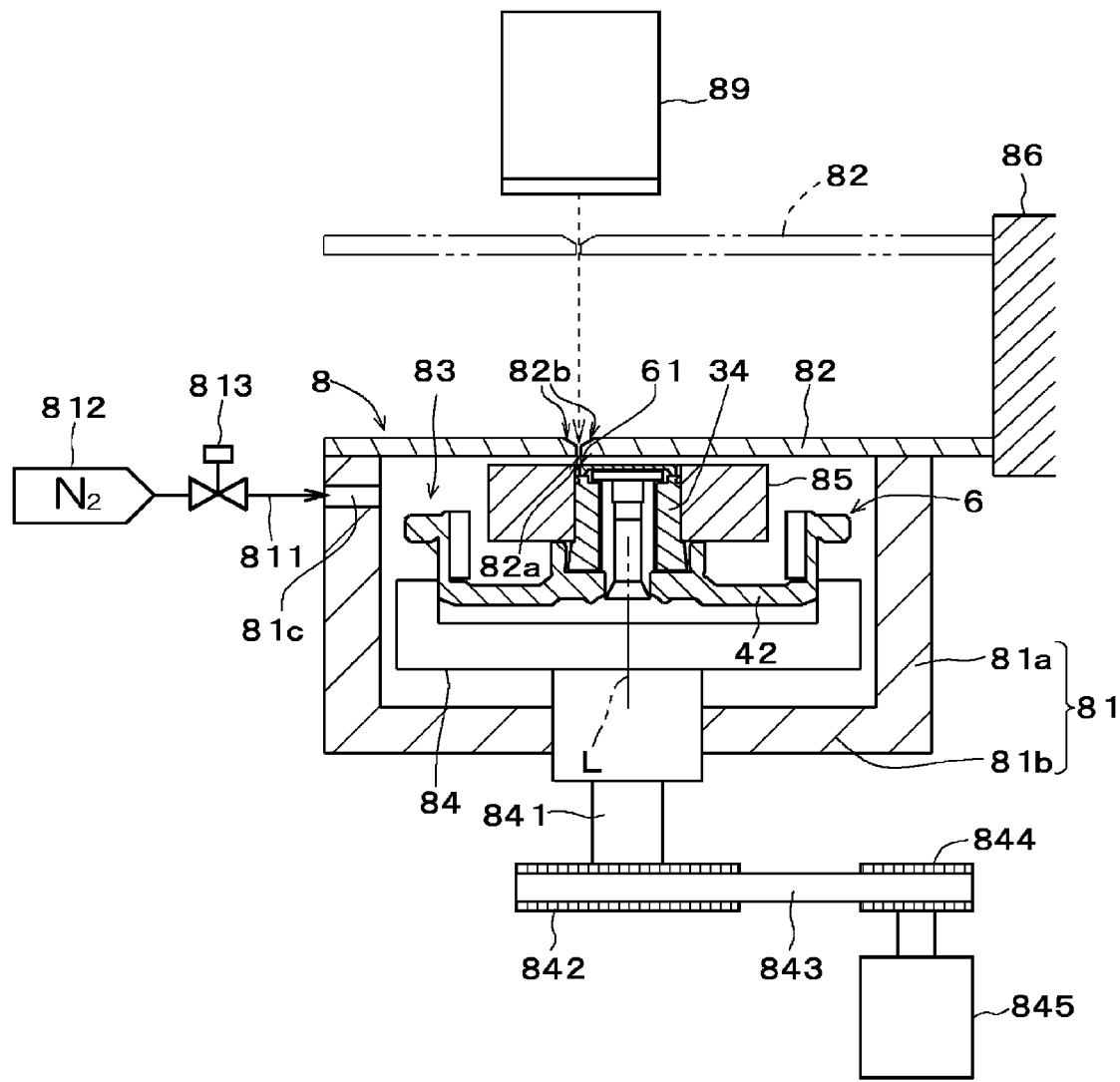
FIG. 12 is a view showing an arrangement for realizing a laser welding process in accordance with a second preferred embodiment of the present invention.

FIG. 12 is a view showing an arrangement for realizing the laser welding process in accordance with the second preferred embodiment. As shown in FIG. 12, a chamber type jig 8, which preferably accommodates therein the workpiece 6, and a laser light source 89 are preferably used in the laser welding process of the present preferred embodiment. The jig 8 preferably includes a lower box member 81, which has a sidewall 81a and a bottom wall 81b, and an upper plate member 82 arranged to close the top opening of the lower box member 81.

Within the internal space 83 of the jig 8 surrounded by the lower box member 81 and the upper plate member 82, there is provided a chuck unit 84 which preferably holds the workpiece 6 in such a posture as to ensure that the target processing point 61 of the workpiece 6 faces toward the upper plate member 82. A shaft 841 which extends to the outside of the lower box member 81 through the bottom wall 81b of the latter is preferably attached to the underside of the chuck unit 84. Also, arranged at the underside of the chuck unit 84 preferably are a motor 845 which provides rotating power to the shaft 841 through a driven pulley 842, an endless belt 843 and a driving pulley 844. If the motor 845 is operated with the workpiece 6 held in the chuck unit 84, the chuck unit 84 and the workpiece 6 preferably rotate about the central axis L.

In the present preferred embodiment, a substantially cylindrical commutator member 85 is preferably attached to the outer circumferential surface of the sleeve 34 of the workpiece 6. The upper surface of the commutator member 85 preferably extends around the surface of the workpiece 6 (the surfaces of the sleeve 34 and the cap 35) containing the target processing point 61, with little or substantially no step left therebetween. The upper surface of the commutator member 85 is preferably opposed to the lower surface of the upper plate member 82.

In the sidewall 81a of the lower box member 81, there is preferably formed an inlet port 81c through which nitrogen gas is introduced into the internal space 83 of the jig 8. A nitrogen gas supplying pipe 811 is preferably connected to the inlet port 81c and a nitrogen gas source 812 is coupled to the upstream end portion of the nitrogen gas supplying pipe 811. A shutoff valve 813 is preferably provided at the nitrogen gas supplying pipe 811. Therefore, if the shutoff valve 813 is opened, nitrogen gas is preferably supplied from the nitrogen gas source 812 into the internal space 83 of the jig 8 through the nitrogen gas supplying pipe 811 and the inlet port 81c.

The upper plate member 82 preferably includes a laser passage hole 82a through which the laser light irradiated from the laser light source 89 travels. The laser passage hole 82a is preferably arranged in such a position as to face toward the target processing point 61 of the workpiece 6 when the workpiece 6 is held by the chuck unit 84. In the laser welding process according to the present preferred embodiment, in a same manner as in the first preferred embodiment, the annular contact surface between the sleeve 34 and the cap 35 is preferably welded over its substantially entire circumference while rotating the workpiece 6 about the central axis L. The target processing point 61 is preferably set at one point through which the contact surface passes during rotation of the workpiece 6. The laser passage hole 82a is preferably arranged above the target processing point 61. As shown in FIG. 12, the laser passage hole 82a preferably includes a tapered edge portion 82b converging toward the internal space 83 (the workpiece 6).

An elevating mechanism 86 arranged to move the upper plate member 82 vertically is preferably connected to the upper plate member 82. The elevating mechanism 86 may be realized through the use of, e.g., a combined mechanism of a motor and a ball screw. Many other driving devices well-known in the art may be used in realizing the elevating mechanism 86. When the upper plate member 82 is lifted up, the top opening of the lower box member 81 is preferably opened so that the workpiece 6 can be loaded into or unloaded from the internal space 83 of the jig 8. When the upper plate member 82 is lowered down, the top opening of the lower box member 81 is preferably closed by the upper plate member 82.

Figure 13:
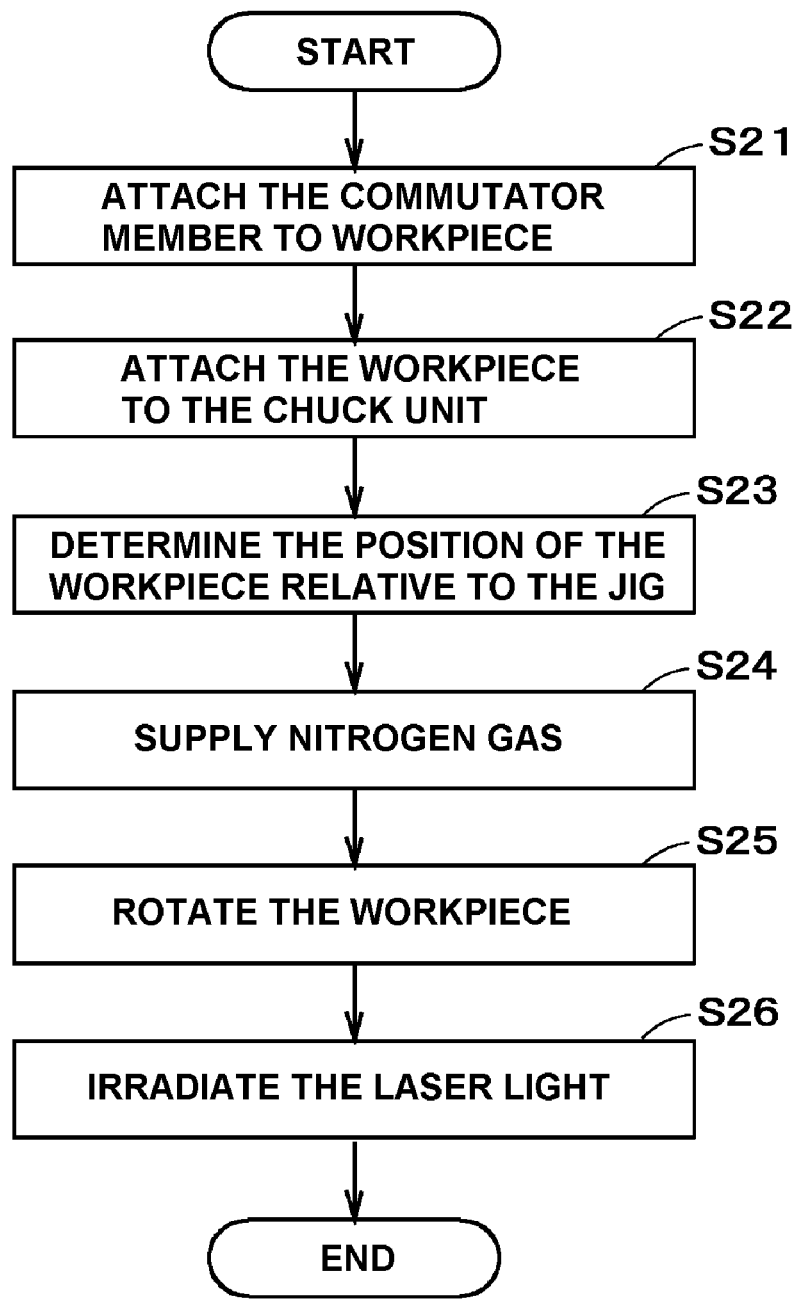
FIG. 13 is a flowchart illustrating the sequence of the laser welding process of the second preferred embodiment.

Next, the sequence of the laser welding process of the present preferred embodiment will be described with reference to the flowchart illustrated in FIG. 13.

When performing the laser welding process of the present preferred embodiment, the commutator member 85 is first attached to the outer circumferential surface of the sleeve 34 of the workpiece 6 (step S21). Then the workpiece 6 holding the commutator member 85 is loaded into the lower box member 81 and attached to the chuck unit 84 in such a posture that the target processing point 61 preferably faces upwards (step S22). Once the workpiece 6 is held in place by the chuck unit 84, the elevating mechanism 86 is preferably operated to lower the upper plate member 82 which is standing-by in a position above the lower box member 81, thereby closing the top opening of the lower box member 81. Consequently, the position of the workpiece 6 relative to the jig 8 is determined so that the laser passage hole 82*a* of the upper plate member 82 faces toward the target processing point 61 on the workpiece 6 (step S23).

Next, the shutoff valve 813 arranged on the nitrogen gas supplying pipe 811 is preferably opened so as to supply nitrogen gas from the nitrogen gas source 812 into the internal space 83 of the jig 8 through the nitrogen gas supplying pipe 811 and the inlet port 81*c* (step S24). The nitrogen gas introduced through the inlet port 81*c* of the lower box member 81 is preferably filled in the internal space 83 of the jig 8. In the space between the workpiece 6 and the upper plate member 82, there is preferably created a nitrogen gas stream flowing from the peripheral area of the laser passage hole 82*a* toward the laser passage hole 82*a*. The nitrogen gas is preferably discharged to the outside of the jig 8 through the laser passage hole 82*a*.

Then, the motor 845 is preferably operated to provide rotating power to the chuck unit 84 via the driving pulley 844, the endless belt 843 and the driven pulley 842, thereby rotating the chuck unit 84 and the workpiece 6 about the central axis L (step S25). Laser light is continuously irradiated from the laser light source 79 while maintaining the supply of the nitrogen gas and rotating the workpiece 6 (step S26). As a consequence, welding preferably occurs at the target processing point 61 on the workpiece 6. The contact surface between the sleeve 34 and the cap 35 which moves past the target processing point 61 along with rotation of the workpiece 6 is preferably welded over the entire circumference thereof.

Figure 14:
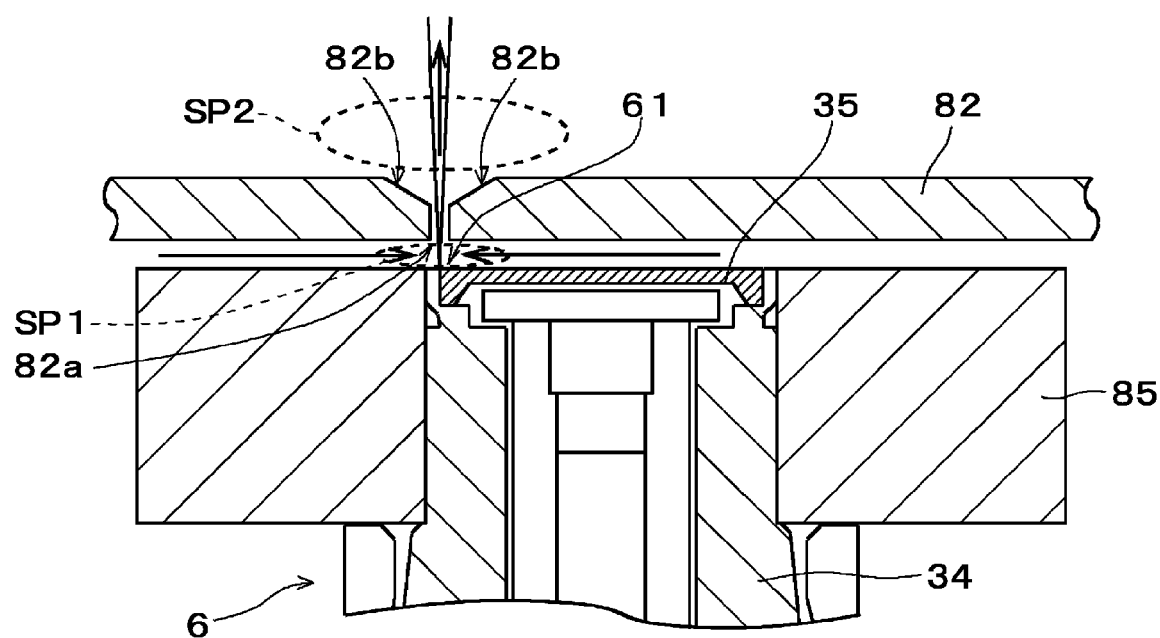
FIG. 14 is a view showing a state established around a target processing point during the laser welding process of the second preferred embodiment.

Upon irradiating the laser light on the target processing point 61 of the workpiece 6, fumes are generally generated from the target processing point 61. In step S26 of the present preferred embodiment, a nitrogen gas stream flowing from the peripheral area of the target processing point 61 toward the target processing point 61 is preferably formed as shown in FIG. 14. The pressure in the space SP1 (a first space) defined between the target processing point 61 and the laser passage hole 82*a* is greater than the pressure in the space SP2 (a second space) defined on the opposite side of the laser passage hole 82*a* from the workpiece 6. This preferably creates a nitrogen gas stream flowing from the space SP1 toward the space SP2 through the laser passage hole 82*a*. By virtue of such configuration, the fumes generated at the target processing point 61 is prevented from diffusing near the surface of the workpiece 6 and is discharged together with the inert gas to the space SP2 through the laser passage hole 82*a*. Thus it becomes possible to prevent the surface of the workpiece 6 (i.e., the surfaces of the sleeve 34 and the cap 35) from being contaminated by the fumes.

In the present preferred embodiment, the nitrogen gas supplied to the internal space 83 of the jig 8 preferably serves to prevent oxidation of the target processing point 61 of the workpiece 6 and also serves as a carrier gas which leads the fumes generated at the target processing point 61 away from the workpiece 6.

In the present preferred embodiment, the commutator member 85 is preferably attached to the workpiece 6. Therefore, a thin space is arranged between the surface of the workpiece 6 which includes the target processing point 61 and the lower surface of the upper plate member 82 and between the commutator member 85 extending around the workpiece 6 and the lower surface of the upper plate member 82. Within the thin space, there is effectively created a nitrogen gas stream flowing from the peripheral area of the target processing point 61 toward the target processing point 61.

The jig 8 of the present preferred embodiment is preferably configured so as to isolate the workpiece 6 within the chamber. By virtue of such configuration, even if the fumes flowing out through the laser passage hole 82*a* are diffused outside the jig 8, the possibility of the fumes reaching the surface of the workpiece 6 is minimized. In other words, the jig 8 of the present preferred embodiment is capable of protecting the workpiece 6 from the fumes discharged to the outside, thereby reliably preventing the surface of the workpiece 6 from being contaminated by the fumes.

The laser passage hole 82*a* of the present preferred embodiment preferably includes the tapered edge portion 82*b* converging toward the internal space 83 (the workpiece 6). By virtue of such configuration, the laser passage hole 82*a* shows a flow resistance smaller than that available when the tapered edge portion 82*b* would be absent. This ensures that the nitrogen gas and the fumes are smoothly discharged through the laser passage hole 82*a*.

Like the guide grooves 71*c* arranged at the lower surface of the upper plate member 71 in the first preferred embodiment, a plurality of guide grooves each radially extending around the laser passage hole 82*a* may be arranged at the lower surface of the upper plate member 82 of the present preferred embodiment. Arranging such guide grooves makes it possible to further effectively create a nitrogen gas stream flowing toward the laser passage hole 82*a*.

Figure 19:
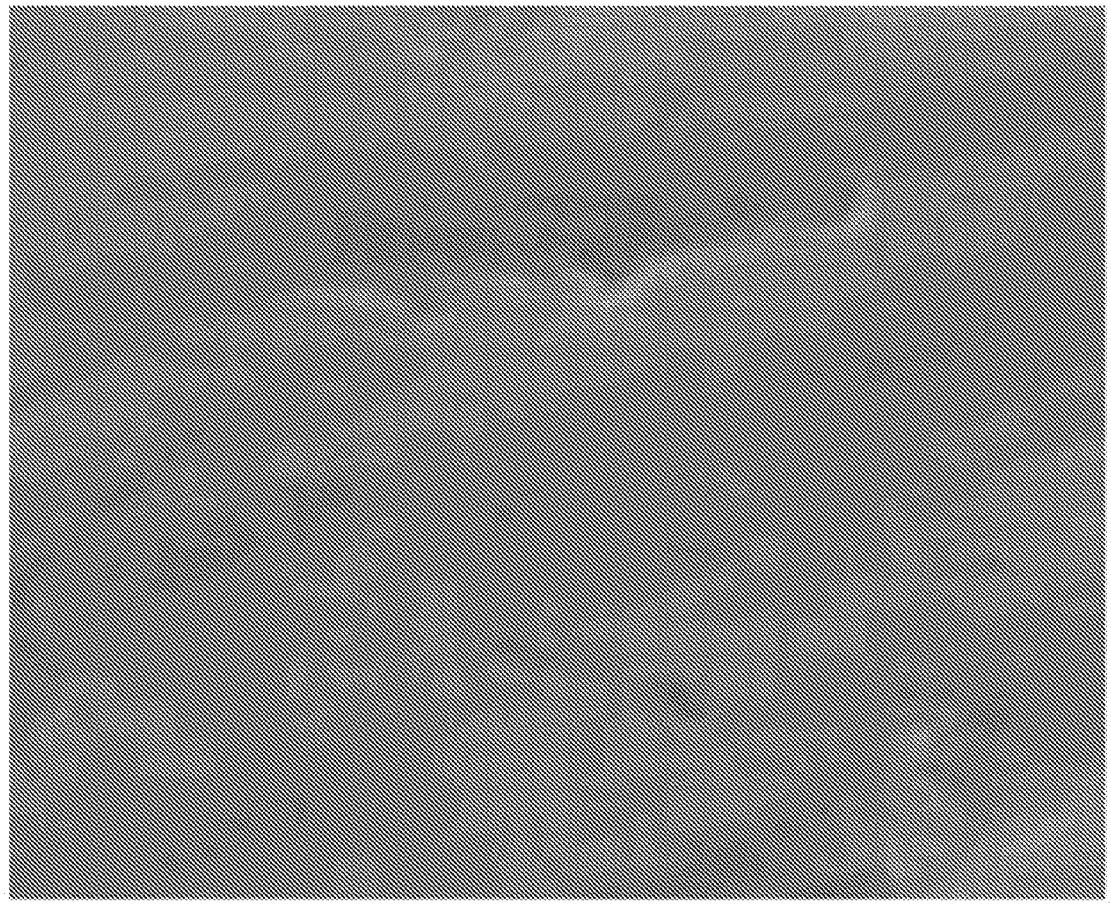
FIG. 19 is a micrograph showing the surface of the workpiece near the target processing point after the laser welding process of the second preferred embodiment has been performed.
Figure 20:
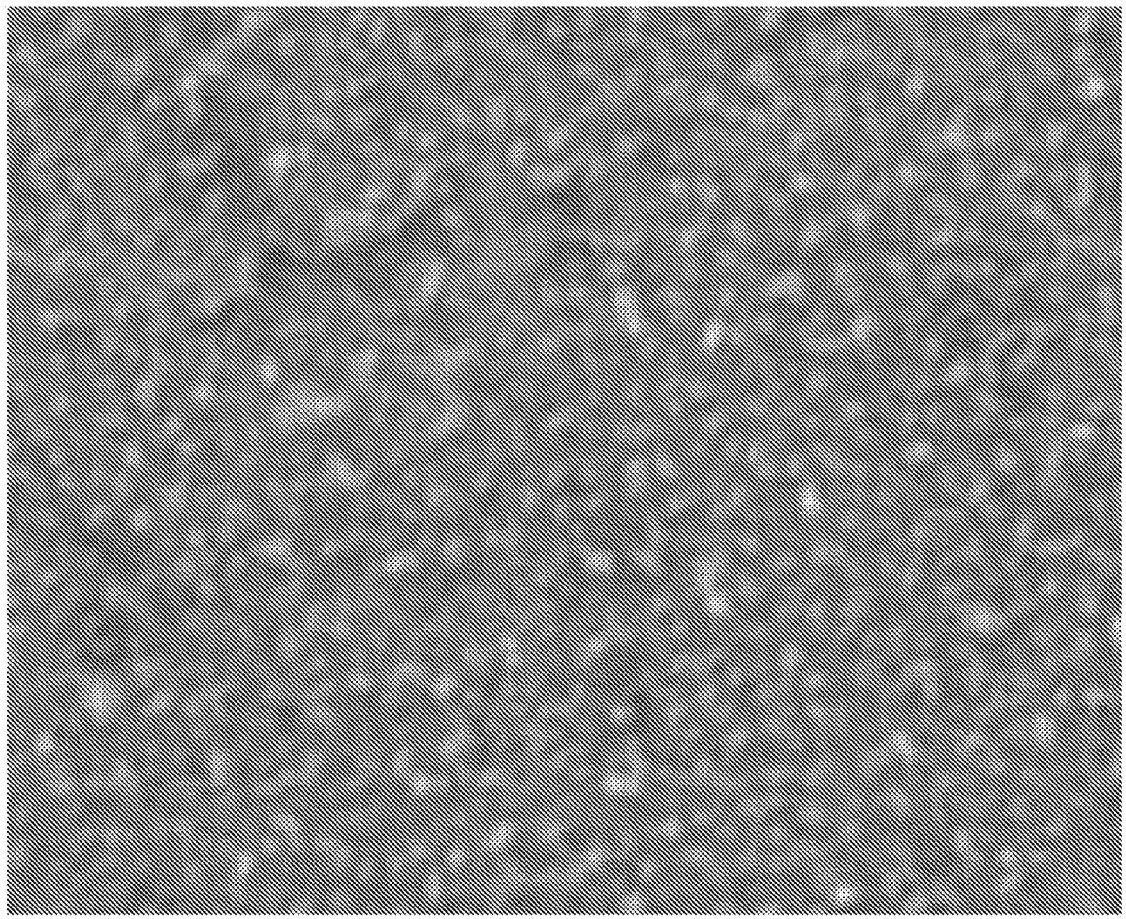
FIG. 20 is a micrograph showing the surface of the workpiece near the target processing point after the laser welding has been performed according to a conventional method.

FIG. 19 is a micrograph showing the surface of the workpiece 6 near the target processing point 61 after the sleeve 34 and the cap 35 are connected to one another by the laser welding process of the present preferred embodiment. In the example shown in FIG. 19, laser welding is performed in a state that the gap between the target processing point 61 on the workpiece 6 and the upper plate member 82 is approximately 0.3 mm and the aperture diameter of the laser passage hole 82*a* of the upper plate member 82 is approximately 1.0 mm. Comparing the example shown in FIG. 19 with the conventional example illustrated in FIG. 20, it can be noted that no white spot appears in the example shown in FIG. 19, while a lot of white spots generated due to the adherence of fumes to the surface of the workpiece 6 are observed in the conventional example illustrated in FIG. 20. This means that, as compared to the conventional laser welding, the laser welding of the present preferred embodiment prevents the fumes from adhering to the surface of the workpiece 6.

5. Laser Welding (Third Preferred Embodiment)

Next, description will be made on a laser welding process in accordance with a third preferred embodiment of the present invention.

Figure 15:
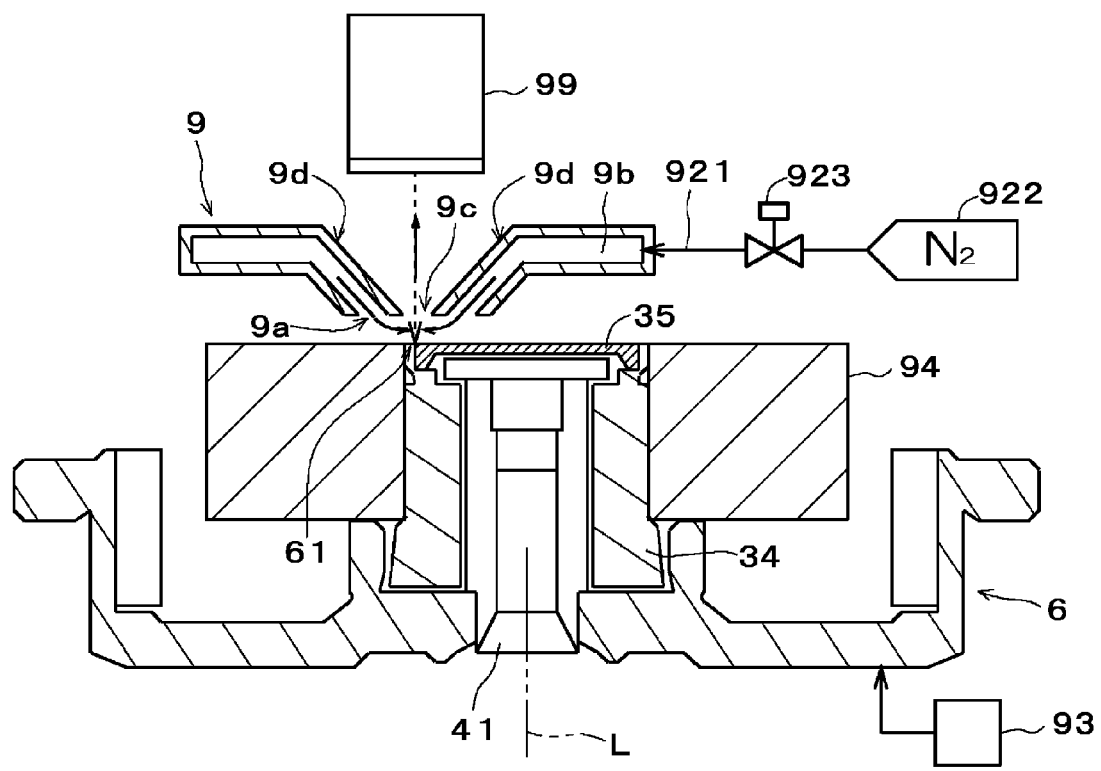
FIG. 15 is a view showing an arrangement for realizing a laser welding process in accordance with a third preferred embodiment of the present invention.

FIG. 15 is a view showing an arrangement for realizing the laser welding process in accordance with the third preferred embodiment. As shown in FIG. 15, a nozzle type jig 9 which injects nitrogen gas toward the target processing point 61 on the workpiece 6, and a laser light source 99 which irradiates laser light on the target processing point 61 are preferably used in the laser welding process of the present preferred embodiment.

Figure 16:
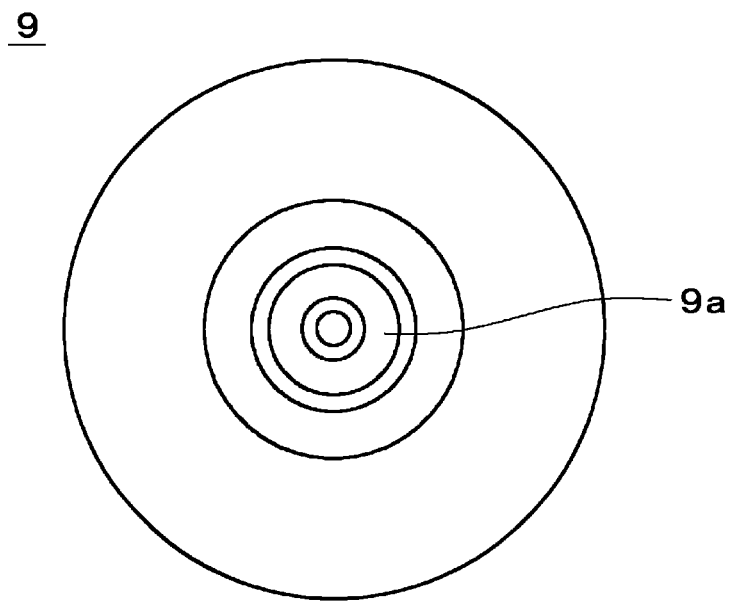
FIG. 16 is a view showing a jig used in the laser welding process of the third preferred embodiment as seen from the workpiece side.

FIG. 16 is a view showing the jig 9 as seen from the lower surface thereof (i.e., from the workpiece 6). As shown in FIGS. 15 and 16, an annular ejection port 9*a* is preferably arranged on the lower surface of the jig 9. Arranged within the jig 9 is a tubular gas flow path 9*b* which communicates with the ejection port 9*a*. As can be seen in FIG. 15, a nitrogen gas supplying pipe 921 is preferably connected to the outer circumferential end of the gas flow path 9*b*. Also, a nitrogen gas source 922 is preferably joined to the upstream end portion of the nitrogen gas supplying pipe 921. A shutoff valve 923 is preferably provided on the nitrogen gas supplying pipe 921. Therefore, if the shutoff valve 923 is opened, nitrogen gas is preferably supplied from the nitrogen gas source 922 into the gas flow path 9*b* of the jig 9 through the nitrogen gas supplying pipe 921. Then the nitrogen gas is preferably ejected downwardly from the ejection port 9*a*.

The gas flow path 9*b* communicating with the ejection port 9*a* preferably includes an inclined space converging toward the ejection port 9*a*. By virtue of such configuration, the nitrogen gas ejected from the ejection port 9*a* is preferably injected toward a single convergence point lying below the jig 9, i.e., toward a point on which the target processing point 61 of the workpiece 6 lies during the welding operation.

Arranged inwardly of the ejection port 9*a* of the jig 9 is a laser passage hole 9*c* through which the laser light irradiated from the laser light source 99 preferably travels. The jig 9 can be moved by a moving mechanism (not shown). The position of the jig 9 is preferably adjusted to ensure that the laser passage hole 9*c* faces toward the target processing point 61 of the workpiece 6 during the laser welding operation. As shown in FIG. 15, a tapered edge portion 9*d* converging toward the workpiece 6 is preferably arranged around the laser passage hole 9*c*.

As conceptually depicted in FIG. 15, the workpiece 6 is preferably supported by a rotary mechanism 93 arranged to rotate the workpiece 6 about the central axis L. The rotary mechanism 93 may be realized by, e.g., combining a chuck for holding the workpiece 6 and a motor for rotating the chuck. In the laser welding process of the present preferred embodiment, like the first and second preferred embodiments, the annular contact surface between the sleeve 34 and the cap 35 is preferably welded over its substantially entire circumference while rotating the workpiece 6 about the central axis L. The target processing point 61 is preferably set at one point through which the contact surface passes during rotation of the workpiece 6.

In the present preferred embodiment, a substantially cylindrical commutator member 94 is preferably attached to the outer circumferential surface of the sleeve 34 of the workpiece 6. When the commutator member 94 is attached to the workpiece 6, the upper surface of the commutator member 94 preferably extends around the surface of the workpiece 6 (the surfaces of the sleeve 34 and the cap 35) which contains the target processing point 61, with little or substantially no step left therebetween. The upper surface of the commutator member 94 is preferably opposed to the ejection port 9*a* of the jig 9.

Figure 17:
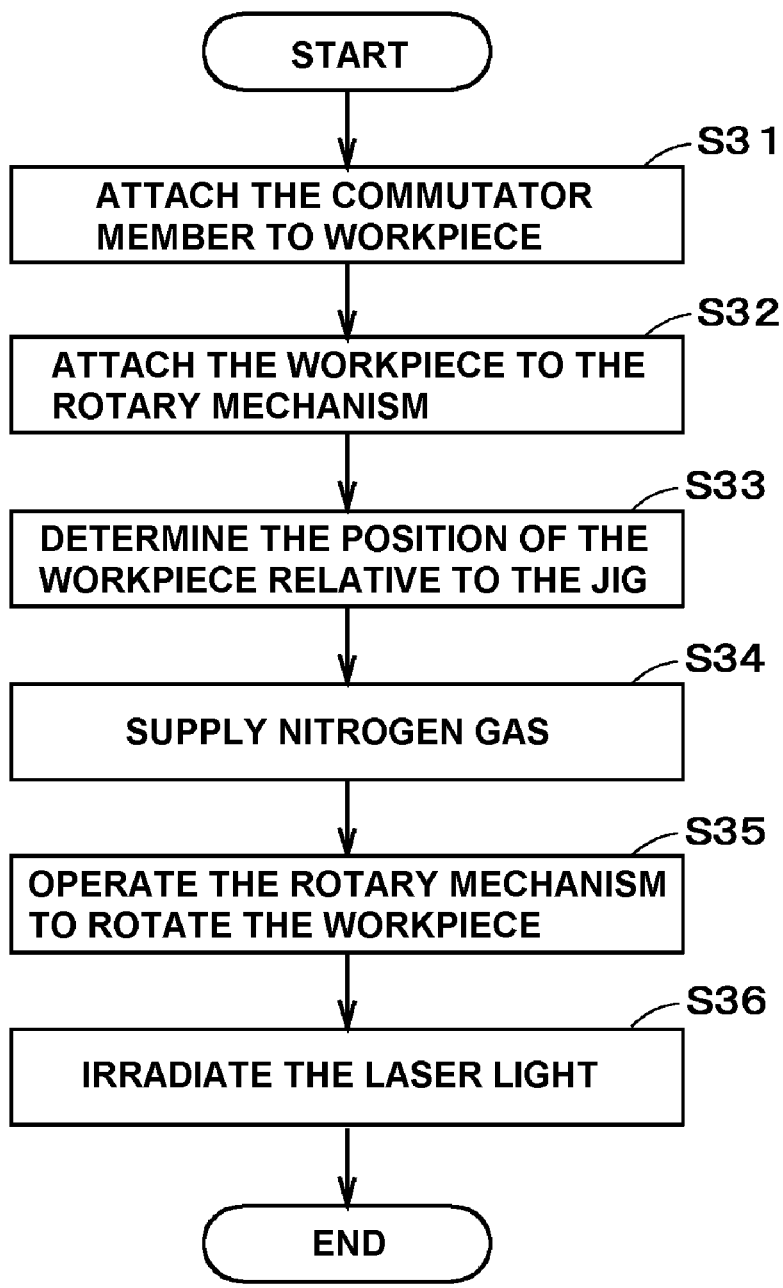
FIG. 17 is a flowchart illustrating the sequence of the laser welding process of the third preferred embodiment.

Next, the sequence of the laser welding process of the present preferred embodiment will be described with reference to the flowchart illustrated in FIG. 17.

When performing the laser welding process of the present preferred embodiment, the commutator member 94 is preferably first attached to the outer circumferential surface of the sleeve 34 of the workpiece 6 (step S31). Then the workpiece 6 which holds the commutator member 94 is preferably mounted to the rotary mechanism 93 in such a posture as to ensure that the target processing point 61 of the workpiece 6 faces upwards (step S32). The jig 9 is preferably moved by the moving mechanism (not shown) to adjust the position of the workpiece 6 relative to the jig 9 so that the laser passage hole 9*c* faces toward the target processing point 61 on the workpiece 6, and also so that the optical axis of the laser light source 99 can coincide with the center of the laser passage hole 9*c* (step S33).

Next, the shutoff valve 923 arranged on the nitrogen gas supplying pipe 921 is preferably opened so as to supply a nitrogen gas from the nitrogen gas source 922 into the gas flow path 9*b* of the jig 9 through the nitrogen gas supplying pipe 921 (step S34). The nitrogen gas supplied into the gas flow path 9*b* is preferably ejected from the ejection port 9*a* toward the target processing point 61 of the workpiece 6. In the space between the workpiece 6 and the jig 9, there is preferably created a nitrogen gas stream flowing from the peripheral area of the laser passage hole 9*c* toward the laser passage hole 9*c*. The nitrogen gas is preferably discharged to above the jig 9 through the laser passage hole 9*c*.

Then, the rotary mechanism 93 is operated to rotate the workpiece 6 about the central axis L (step S35). Laser light is preferably allowed to continuously irradiate laser light while maintaining the supply of the nitrogen gas and rotate the workpiece 6 (step S36). As a consequence, welding occurs at the target processing point 61 on the workpiece 6. The contact surface between the sleeve 34 and the cap 35 which moves past the target processing point 61 along with rotation of the workpiece 6 is preferably welded over approximately the entire circumference thereof.

Figure 18:
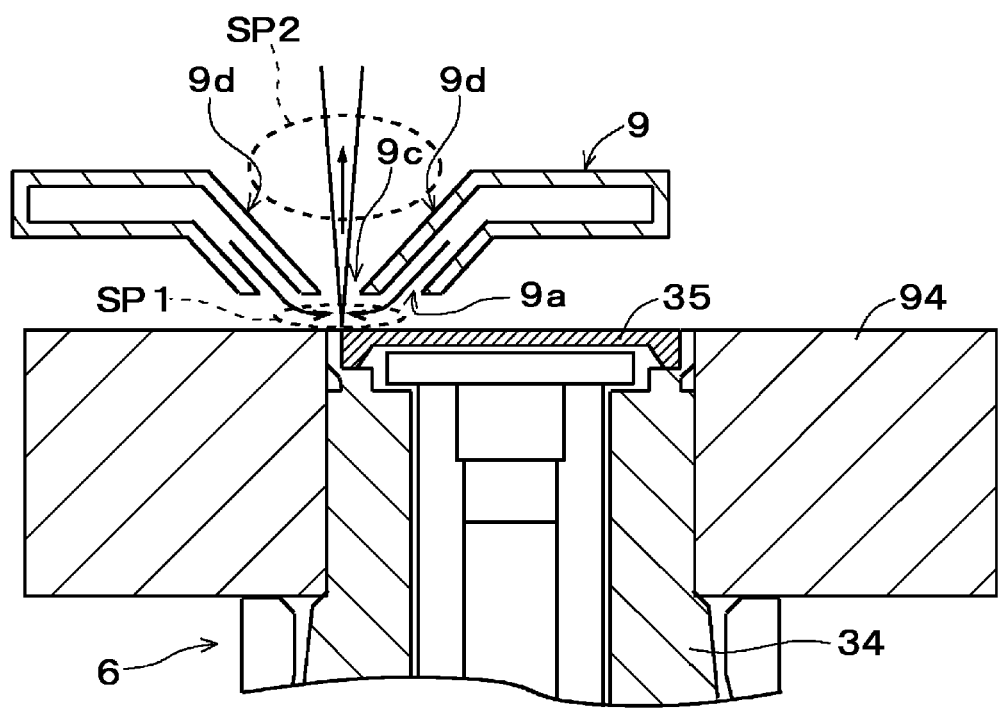
FIG. 18 is a view showing a state established around a target processing point during the laser welding process of the third preferred embodiment.

Upon irradiating the laser light on the target processing point 61 of the workpiece 6, fumes are generally generated from the target processing point 61. In step S36 of the present preferred embodiment, a nitrogen gas stream flowing from the peripheral area of the target processing point 61 toward the target processing point 61 is preferably formed as shown in FIG. 18. The pressure in the space SP1 (a first space) defined between the target processing point 61 and the laser passage hole 9*c* is greater than the pressure in the space SP2 (a second space) defined on the opposite side of the laser passage hole 9*c* from the workpiece 6. This preferably creates a nitrogen gas stream flowing from the space SP1 toward the space SP2 through the laser passage hole 9*c*. By virtue of such configuration, the fumes generated at the target processing point 61 is prevented from diffusing near the surface of the workpiece 6 and is discharged together with the inert gas to the space SP2 through the laser passage hole 9*c*. Thus it becomes possible to prevent the surface of the workpiece 6 (mainly, the surfaces of the sleeve 34 and the cap 35) from being contaminated by the fumes.

In the present preferred embodiment, the nitrogen gas ejected from the ejection port 9*a* of the jig 9 preferably serves to prevent oxidation of the target processing point 61 of the workpiece 6 and also serves as a carrier gas that leads the fumes generated at the target processing point 61 away from the workpiece 6.

In the present preferred embodiment, the commutator member 94 is preferably attached to the workpiece 6. Therefore, the nitrogen gas ejected from the ejection port 9*a* of the jig 9 flows along the surface of the workpiece 6 containing the target processing point 61 and along the upper surface of the commutator member 94 extending around the workpiece 6. This effectively creates a nitrogen gas stream flowing from the peripheral area of the target processing point 61 toward the target processing point 61.

Around the laser passage hole 9c of the present preferred embodiment, there is formed the tapered edge portion 9d converging toward the workpiece 6. By virtue of such configuration, the laser passage hole 9c shows a flow resistance smaller than that available when the tapered edge portion 9d would be absent. This ensures that the nitrogen gas and the fumes are smoothly discharged through the laser passage hole 9c.

The jig 9 of the present preferred embodiment may be freely position-determined relative to the workpiece 6. This makes it possible to freely adjust the position and posture of the jig 9 relative to the target processing point 61 on the workpiece 6, whereby the jig 9 can be applied to workpieces having many different shapes.

Like the guide grooves 71c arranged at the lower surface of the upper plate member 71 in the first preferred embodiment, a plurality of guide grooves radially extending around the laser passage hole 9c may be formed on the wall surface of the gas flow path 9b (e.g., on the rear surface of the edge portion 9d) in the jig 9 of the present preferred embodiment. Provision of such guide grooves makes it possible to more effectively create a nitrogen gas stream flowing toward the laser passage hole 9c.

6. Modified Preferred Embodiments

While preferred embodiments of the present invention have been described hereinabove, the present invention is not limited thereto. For example, although the unit including the sleeve 34, the cap 35, the shaft 41 and the hub 42 has been used as the workpiece 6 in performing the laser welding operation in the foregoing preferred embodiments, the workpiece to be laser-welded may not be necessarily confined to such a unit. In case where the shaft 41 has no flange member 411, for example, the unit consisting of the sleeve 34 and the cap 35 may be used as a workpiece in performing the laser welding operation. At the end of the laser welding operation, the shaft 41 may be inserted into the sleeve 34.

Although the foregoing preferred embodiments are directed to an instance in which the sleeve 34 and the cap 35 are connected to one another by laser welding, other points on the workpiece 6 may be selected as the target processing point in the laser processing method of the present invention. Specifically, in the manufacturing process of such articles as the bearing device 5, the spindle motor 1, the disk drive apparatus 2, a fan and the like, which suffer from a fume adherence problem, it may be possible to use an arbitrary precision part of the articles as a workpiece. In this case, laser processing may be performed at an arbitrary target processing point on the workpiece.

Although laser welding has been described as one example of the laser processing in the foregoing preferred embodiments, the laser processing method of the present invention may be applied to laser processing other than the laser welding., e.g., laser forming in which the posture of a workpiece is adjusted by irradiating laser light, laser trimming in which the surface of a workpiece is cut by irradiating laser light and laser marking in which letters or symbols are carved on the surface of a workpiece by irradiating laser light.

Although the foregoing preferred embodiments are directed to an instance where a nitrogen gas stream is formed along the surface of the workpiece 6, the gas used in the present invention is not limited to the nitrogen gas but may be other inert gases capable of reducing oxidation of the target processing point.

In the laser processing method of the present invention, a further enhanced effect is attainable if the following constructions are employed.

The jig preferably includes a plate member opposed to a surface of the workpiece containing the target processing point when the workpiece is set in place, the plate member having a laser passage hole. This construction makes it possible to effectively create an inert gas stream flowing from the peripheral area of the target processing point toward the target processing point.

A Guide groove radially extending around the laser passage hole is preferably arranged on a surface of the plate member facing toward the workpiece. This makes it possible effectively create, between the workpiece and the plate member, an inert gas stream flowing from the peripheral area of the target processing point toward the target processing point.

The laser passage hole includes a tapered edge portion converging toward the workpiece. This construction helps reduce the flow resistance of the laser passage hole, thereby allowing fumes to be discharged well through the laser passage hole.

The laser light is continuously irradiated while rotating the workpiece about a specified central axis. This construction makes it possible to perform laser processing on a arc-shaped target processing region of the workpiece.

The first member and the second member of the workpiece are connected to one another by irradiating laser light on a target processing point at which the first member and the second member make contact with each other. This construction makes it possible to bond the first member and the second member together while preventing the surface of the workpiece from being contaminated by fumes.

The jig is a hollow member including a first plate member and a second plate member, the hollow member having an internal space of reduced thickness formed between the first plate member and the second plate member, the first plate member having a laser passage hole, the second plate member having a workpiece insertion hole into which a part of the workpiece containing the target processing point is inserted. After the part of the workpiece containing the target processing point is inserted into the workpiece insertion hole, the inert gas is introduced into the hollow member to create a stream flowing from the peripheral area of the target processing point toward the target processing point within the hollow member. This construction makes it possible to easily attach and detach the workpiece and the jig and also to rapidly create a stream of the inert gas.

A gap is arranged between an edge portion of the workpiece insertion hole and the workpiece when the workpiece is set in place with respect to the jig, the gap being smaller in size than the laser passage hole. This construction makes it possible to prevent the fumes generated at the target processing point from flowing toward the workpiece through the gap between the edge portion of the workpiece insertion hole and the workpiece.

The part of the workpiece containing the target processing point is caused to protrude out of the workpiece insertion hole into the hollow member. This construction makes it possible to more reliably prevent the fumes generated at the target processing point from flowing toward the workpiece through the gap between the edge portion of the workpiece insertion hole and the workpiece.

The jig is a chamber including a plate member opposed to the surface of the workpiece containing the target processing point when the workpiece is accommodated within the chamber, the plate member having a laser passage hole. After the workpiece is set in place within the chamber so that the laser passage hole can face toward the target processing point on the workpiece, the inert gas is introduced into the chamber to create, between the workpiece and the plate member, a stream flowing from the peripheral area of the target processing point toward the target processing point. This construction makes it possible to isolate the workpiece within the chamber and to protect the workpiece from the fumes discharged to the outside of the chamber.

A commutator member is attached to the workpiece, the commutator member having a surface extending around the target processing point when the commutator member is attached to the workpiece. This construction makes it possible to effectively form a stream of the inert gas in between the workpiece and the plate member.

The jig is a nozzle having an annular ejection port from which the inert gas is ejected toward a specified convergence point, the nozzle having a laser passage hole formed inwardly of the ejection port. After the nozzle and the workpiece are arranged so that the laser passage hole can face toward the target processing point on the workpiece, the inert gas is ejected from the nozzle to create, between the nozzle and the workpiece, a stream flowing from the peripheral area of the target processing point toward the target processing point. This construction makes it possible to effectively create a stream of the inert gas near the target processing point regardless of the shape of the workpiece.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A laser processing method comprising the steps of:
   a) setting a workpiece with respect to a jig including a plate member with a laser passage hole defined therein and a lower member, a lower surface of the plate member opposing the lower member, and determining a relative position of the jig and the workpiece so that the laser passage hole faces toward a target processing point on the workpiece; and
   b) subsequently to step a), irradiating laser light on the target processing point through the laser passage hole while creating a stream of an inert gas flowing from a peripheral area of the target processing point toward the target processing point and flowing away from the workpiece through the laser passage hole; wherein
   the lower member includes a workpiece insertion hole into which a portion of the workpiece containing the target processing point is inserted, at least a portion of an inner peripheral surface of the workpiece insertion hole is arranged to oppose at least a portion of an outer peripheral surface of the workpiece in a radial direction;
   the jig includes a hollow member including the plate member and the lower member, the hollow member including an internal space between the plate member and the lower member, and the inert gas is introduced into the hollow member in step b) to create the stream flowing from the peripheral area of the target processing point toward the target processing point within the hollow member; and
   a gap is provided between the inner peripheral surface of the workpiece insertion hole and the outer peripheral surface of the workpiece when the workpiece is set in place with respect to the jig, the gap being smaller in size than the laser passage hole.

2. The laser processing method of claim 1, wherein, in step b), the laser light is irradiated on the target processing point through the laser passage hole while maintaining a pressure of the inert gas in a first space between the target processing point and the laser passage hole greater than a pressure in a second space on a side of the laser passage hole opposite to the workpiece to allow the stream of the inert gas to flow from the first space toward the second space through the laser passage hole.

3. The laser processing method of claim 1, wherein a guide groove radially extending around the laser passage hole is provided on a surface of the plate member facing toward the workpiece.

4. The laser processing method of claim 1, wherein the laser passage hole includes a tapered edge portion converging toward the workpiece.

5. The laser processing method of claim 1, wherein the laser light is continuously irradiated in step b) while rotating the workpiece about a central axis of the workpiece.

6. The laser processing method of claim 1, wherein the workpiece includes a first member and a second member, the target processing point being a contact point between the first member and the second member, and the laser light is irradiated on the target processing point in step b) to bond the first member and the second member together.

7. The laser processing method of claim 1, wherein the portion of the workpiece containing the target processing point protrudes axially out of the workpiece insertion hole into the hollow member in step a).

8. The laser processing method of claim 1, wherein the jig includes a chamber including the plate member opposed to a surface of the portion of the workpiece containing the target processing point when the workpiece is accommodated within the chamber, the workpiece is set in place within the chamber in step a), and the inert gas is introduced into the chamber in step b) to create, between the workpiece and the plate member, the stream flowing from the peripheral area of the target processing point toward the target processing point.

9. The laser processing method of claim 8, further comprising the step of:
   attaching a commutator member to the workpiece prior to step b), the commutator member including a surface extending around the target processing point when the commutator member is attached to the workpiece.

10. The laser processing method of claim 1, wherein the jig includes a nozzle including an ejection port from which the inert gas is ejected toward a specified convergence point, the nozzle including a laser passage hole provided inwardly of the ejection port, the nozzle and the workpiece are arranged in step a) so that the laser passage hole faces toward the target processing point on the workpiece, and the inert gas is ejected from the nozzle to create, between the nozzle and the workpiece, the stream flowing from the peripheral area of the target processing point toward the target processing point.

11. The laser processing method of claim 1, wherein the inner peripheral surface of the workpiece insertion hole is arranged to surround or substantially surround an entirety of the outer peripheral surface of the workpiece in a circumferential direction.

* * * * *